United States Patent
Aoki

(10) Patent No.: US 9,124,875 B2
(45) Date of Patent: Sep. 1, 2015

(54) STEREOSCOPIC IMAGING APPARATUS

(75) Inventor: Takashi Aoki, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 648 days.

(21) Appl. No.: 13/478,977

(22) Filed: May 23, 2012

(65) Prior Publication Data

US 2013/0314500 A1    Nov. 28, 2013

(51) Int. Cl.
  *H04N 13/02* (2006.01)
  *H04N 13/04* (2006.01)

(52) U.S. Cl.
  CPC ......... *H04N 13/021* (2013.01); *H04N 13/0217* (2013.01); *H04N 13/0296* (2013.01); *H04N 13/04* (2013.01)

(58) Field of Classification Search
  None
  See application file for complete search history.

(56) References Cited

U.S. PATENT DOCUMENTS

| | | | | |
|---|---|---|---|---|
| 4,862,205 | A * | 8/1989 | Kawamura | 396/222 |
| 6,807,295 | B1 * | 10/2004 | Ono | 382/154 |
| 7,133,608 | B1 * | 11/2006 | Nagata et al. | 396/374 |
| 2005/0159641 | A1 * | 7/2005 | Kanai | 600/101 |
| 2007/0188601 | A1 | 8/2007 | Rohaly et al. | |
| 2007/0188769 | A1 | 8/2007 | Rohaly et al. | |
| 2008/0013943 | A1 | 1/2008 | Rohaly et al. | |
| 2008/0204900 | A1 | 8/2008 | Rohaly et al. | |
| 2008/0273773 | A1 * | 11/2008 | Ernst et al. | 382/128 |
| 2010/0007718 | A1 | 1/2010 | Rohaly, Jr. et al. | |
| 2011/0018972 | A1 * | 1/2011 | Pan | 348/47 |
| 2011/0317030 | A1 * | 12/2011 | Ohbuchi et al. | 348/229.1 |
| 2012/0057000 | A1 | 3/2012 | Rohaly et al. | |
| 2012/0120068 | A1 * | 5/2012 | Chiaki et al. | 345/419 |
| 2012/0212640 | A1 * | 8/2012 | Kojima | 348/222.1 |

FOREIGN PATENT DOCUMENTS

| | | |
|---|---|---|
| JP | 2009-168995 A | 7/2009 |
| JP | 2009-527007 A | 7/2009 |
| WO | 2007/095307 A1 | 8/2007 |

OTHER PUBLICATIONS

Machine Translation of JP2011-215498, Takada et al.*

* cited by examiner

*Primary Examiner* — Sath V Perungavoor
*Assistant Examiner* — Janese Duley
(74) *Attorney, Agent, or Firm* — Sughrue Mion, PLLC

(57) ABSTRACT

A stereoscopic imaging apparatus comprising a single photographic optical system; an image sensor, on which subject images that have passed through different first and second areas in a predetermined direction, respectively, are formed after being pupil-split, photoelectrically converting the subject images that have passed through the first and second areas, respectively, to output a first image and a second image; a diaphragm restricting a light flux incident on the image sensor; a subject information acquiring device acquiring distance information of a subject within a photographic angle of view or a device acquiring an amount of parallax of the subject; and a diaphragm control device controlling an F-number of the diaphragm so that a parallax between the first image and the second image is in a predetermined range based on the acquired distance information of the subject or the acquired amount of parallax of the subject.

14 Claims, 17 Drawing Sheets

STEREOSCOPIC IMAGING APPARATUS

BACKGROUND OF THE INVENTION

1. Field of the Invention

The present invention relates to a stereoscopic imaging apparatus, and more particularly, to a technique for forming subject images that have passed through different areas in a horizontal direction of an photographic optical system on image sensors, respectively, to acquire a left viewpoint image and a right viewpoint image.

2. Description of the Related Art

Known as this type of stereoscopic imaging apparatus has conventionally been one including an optical system illustrated in FIG. 18 (National Publication of International Patent Application No. 2009-527007).

The optical system is configured to pupil-split subject images that have passed through different areas in a horizontal direction of a main lens 1 and a relay lens 2 with a mirror 4 and form the pupil-split subject images on image sensors 7 and 8 via imaging lens 5 and 6, respectively.

FIG. 19 illustrates separated states of images formed on an image sensor depending on a difference between front-focus, in-focus (best focus), and back-focus. In FIG. 19, the mirror 4 illustrated in FIG. 18 is omitted to compare differences in separation depending on the focus.

Out of the pupil-split images, the images that are in focus are formed at the same position on the image sensor (match), as illustrated in a portion (B) of FIG. 19, while the images that are in front focus or in back focus are respectively formed at different positions on the image sensor (separate), as illustrated in portions (A) and (B) of FIG. 19.

Therefore, the subject images, which have been pupil-split in a horizontal direction, are respectively acquired via the image sensors 7 and 8 so that a left viewpoint image and a right viewpoint image (a 3D image), between which there is a parallax that differs depending on a subject distance, can be acquired.

Japanese Patent Application Laid-Open No. 2009-168995 discusses an imaging apparatus capable of acquiring a left viewpoint image and a right viewpoint image corresponding to subject images, which have been pupil-split in a horizontal direction, in a similar manner to the above and performing focus detection (detecting a defocus amount) for a substantially whole area of a photographing screen, and particularly discusses being able to adjust a stereoscopic effect by changing an F-number of a diaphragm in Paragraph [0047].

A parallax (a separation width) between the left viewpoint image and the right viewpoint image, which are captured by this type of stereoscopic imaging apparatus, differ depending on a subject distance if the left and right viewpoint images have the same focal length and the same F-number. Particularly in the case of close-up photographing, a parallax of a near subject is too large so that stereoscopic viewing becomes impossible. On the other hand, a parallax of a far subject is often small so that no stereoscopic effect is given.

Japanese Patent Application Laid-Open No. 2009-168995 discusses being able to adjust a stereoscopic effect by changing an F-number of a diaphragm and does not discuss controlling the diaphragm.

SUMMARY OF THE INVENTION

The present invention is directed to providing a stereoscopic imaging apparatus capable of automatically optimizing a parallax between a left viewpoint image and a right viewpoint image.

According to a first aspect of the present invention, a stereoscopic imaging apparatus includes a single photographic optical system, an image sensor, on which subject images that have passed through different first and second areas in a predetermined direction of the photographic optical system, respectively, are formed after being pupil-split, configured to photoelectrically convert the subject images that have passed through the first and second areas, respectively, to output a first image and a second image, a diaphragm configured to restrict a light flux incident on the image sensor, a subject information acquiring unit configured to acquire distance information of a subject within a photographic angle of view or an amount of parallax of the subject, and a diaphragm control unit configured to control an F-number of the diaphragm so that a parallax between the first image and the second image is in a predetermined range based on the acquired distance information of the subject or the acquired amount of parallax of the subject.

While the amount of parallax can be changed depending on the F-number of the diaphragm in the stereoscopic imaging apparatus according to the first aspect, the F-number of the diaphragm is controlled so that the parallax between the first image and the second image is in the predetermined range based on the distance information of the subject or the amount of parallax of the subject. Therefore, the first image and the second image for natural stereoscopic viewing that does not place a burden on the eyes can be acquired irrespective of whether the subject is far or near.

The distance information of the subject within the photographic angle of view can be acquired at the time of an automatic focus (AF) operation before main photographing, or the amount of parallax of the subject within the photographic angle of view can be detected based on the first image and the second image that have been acquired before the main photographing. The F-number of the diaphragm is controlled based on the acquired distance information or the acquired amount of parallax of the subject. For example, the F-number of the diaphragm is controlled so that the parallax of the nearest subject within the photographic angle of view is not too large or the parallax of the subject farthest from the nearest subject is the most suitable parallax based on information relating to the distance of the nearest subject or the distance of the subject farthest from the nearest subject.

The stereoscopic imaging apparatus according to the first aspect may further include an image acquiring unit configured to acquire the first image and the second image before main photographing, and a parallax amount detection unit configured to detect the amount of parallax of the subject within the photographic angle of view based on the first and second images acquired before the main photographing, in which the diaphragm control unit may control the F-number of the diaphragm so that the parallax between the first and second images output from the image sensor at the time of the main photographing based on the detected amount of parallax is in the predetermined range. A rough amount of parallax of the subject is acquired based on the first and second images acquired before the main photographing, and the F-number of the diaphragm is controlled based on the acquired amount of parallax of the subject at the time of the main photographing.

In the stereoscopic imaging apparatus according to the first aspect, the diaphragm control unit may bring the diaphragm into an open state when acquiring the first image and the second image before the main photographing. The diaphragm at the time of the main photographing is brought into an open state so that the amount of parallax of the subject can be acquired in a bright state and in a state where the amount of parallax becomes the largest. Thus, the accuracy of adjustment of the amount of parallax can be increased.

The stereoscopic imaging apparatus according to the first aspect may further include a parallax amount detection unit configured to detect the amount of parallax of the subject within the photographic angle of view based on the first and second images acquired before the main photographing, and a warning unit configured to display a warning when the parallax between the first and second images obtained at the time of the main photographing based on the detected amount of parallax is not in the predetermined range. If the parallax of the subject cannot be in the predetermined range only by controlling the F-number of the diaphragm, a user is notified by previously displaying the warning.

According to a second aspect of the present invention, the stereoscopic imaging apparatus includes a single photographic optical system, an image sensor, on which subject images that have passed through different first and second areas in a predetermined direction of the photographic optical system, respectively, are formed after being pupil-split, configured to photoelectrically convert the subject images that have passed through the first and second areas, respectively, to output a first image and a second image, a diaphragm configured to restrict a light flux incident on the image sensor, a recognition unit configured to recognize a main subject, a diaphragm control unit configured to control an F-number of the diaphragm depending on the recognized main subject. According to the second aspect, images, between which there is a parallax most suitable for the main subject, can be captured.

In the stereoscopic imaging apparatus according to the second aspect, the diaphragm control unit may perform control so that an aperture of the diaphragm is increased when the recognized main subject is a person or a scene. If the main subject is the person, the parallax is made larger so that a stereoscopic effect of the person can be emphasized. If the main subject is the scene, the subject is often far. Therefore, the parallax is made larger so that a stereoscopic effect is given.

According to a third aspect of the present invention, a stereoscopic imaging apparatus includes a single photographic optical system, an image sensor, on which subject images that have passed through different first and second areas in a predetermined direction of the photographic optical system, respectively, are formed after being pupil-split, configured to photoelectrically convert the subject images that have passed through the first and second areas, respectively, to output a first image and a second image, a diaphragm configured to restrict a light flux incident on the image sensor, a selection unit configured to select a photographing mode, and a diaphragm control unit configured to control an F-number of the diaphragm depending on the selected photographing mode. According to the third aspect, images, between which there is a parallax suitable for the photographing mode, can be captured.

In the stereoscopic imaging apparatus according to the third aspect, the diaphragm control unit may perform control so that the aperture of the diaphragm is increased when the selected photographing mode is a person mode or a scene mode, and perform control so that the aperture of the diaphragm is decreased when the selected photographing mode is a macro mode. If the photographing mode is the person mode, a parallax is made larger so that a stereoscopic effect of a person is emphasized. If the photographing mode is the scene mode, a subject is often far. Therefore, the parallax is made larger so that a stereoscopic effect is given. If macro photographing is performed in the macro mode, a subject is near. Therefore, the number of subjects the parallax of which tends to be large is increased. Thus, the parallax of the subject is made smaller.

According to a fourth aspect of the present invention, a stereoscopic imaging apparatus includes a single photographic optical system, an image sensor, on which subject images that have passed through different first and second areas in a predetermined direction of the photographic optical system, respectively, are formed after being pupil-split, configured to photoelectrically convert the subject images that have passed through the first and second areas, respectively, to output a first image and a second image, a diaphragm configured to restrict a light flux incident on the image sensor, and a diaphragm bracketing photographing unit configured to change an F-number of the diaphragm by performing an operation for issuing a photographing instruction once, to perform main photographing a plurality of times.

According to the fourth aspect, two pieces of images (first and second images) for stereoscopic viewing, between which there are respectively different parallaxes for the same subject, can be captured by performing the operation for issuing the photographing instruction once.

In the stereoscopic imaging apparatus according to the fourth aspect, the diaphragm bracketing photographing unit may change the F-number of the diaphragm every time the main photographing is performed while controlling an amount of exposure at the time of each of the plurality of times of main photographing to be constant. More specifically, the two pieces of images for stereoscopic viewing differ in parallaxes but can be the same in brightness.

The stereoscopic imaging apparatus according to the fourth aspect may further include a F-number image acquiring unit configured to acquire images having a small F-number and images having a large F-number from the image sensor when the diaphragm bracketing photographing unit performs the main photographing the plurality of times, a parallax amount calculation unit configured to calculate a first amount of parallax and a second amount of parallax, respectively, based on the acquired images having a small F-number and the acquired images having a large-number, and an image generation unit configured to generate left and right viewpoint images based on the acquired images having a large F-number and the calculated first and second amounts of parallax.

While the parallax between the images having a small F-number can be increased, a subject at a position other than an in-focus position is easily blurred. On the other hand, while the parallax between the images having a large F-number cannot be increased, a subject is not easily blurred. According to the fourth aspect, the left and right viewpoint images, between which there is a large parallax and in which a subject at the position other than the in-focus position is not easily blurred, can be generated.

The stereoscopic imaging apparatus according to the fourth aspect may further include a parallax amount restriction unit configured to restrict the amount of parallax calculated by the parallax amount calculation unit not to exceed a predetermined maximum value, in which the image generation unit may use the amount of parallax restricted by the parallax amount restriction unit when the left and right viewpoint images are generated. Thus, the parallax between the left and right viewpoint images can be prevented from being too large.

The stereoscopic imaging apparatus according to the fourth aspect may further include a moving object determination unit configured to determine the presence or absence of a moving object within a photographic angle of view based on the amount of parallax calculated by the parallax amount calculation unit, in which the image generation unit may stop generating the right and left parallax images when the moving object determination unit determines that the moving object exists. There is a time difference among a plurality of times of photographing by the diaphragm bracketing photographing unit. When the moving object exists within the photographic angle of view, therefore, good left and right viewpoint images cannot be generated. If the moving object is detected, the generation of the left and right viewpoint images is stopped so that an image, which is not suitable for stereoscopic viewing, is not generated.

In the stereoscopic imaging apparatus according to the fourth aspect, the moving object determination unit may determine that the moving object exists when a difference value at a corresponding pixel between the first and second amounts of parallax calculated by the parallax amount calculation unit exceeds an upper-limit value or a lower-limit value of a defined range at the pixel.

The stereoscopic imaging apparatus according to the fourth aspect may further include a stereoscopic image display unit, a display control unit configured to display each of the acquired images having a small F-number, the acquired images having a large F-number, and the generated left and right viewpoint images on the stereoscopic image display unit, an input unit configured to receive designation of one, to be recorded on a recording medium, of the images displayed on the stereoscopic image display unit by input from a user, and a recording unit configured to record the image designated by the user on the recording medium. Thus, the optimum images out of the three pieces of images for stereoscopic viewing can be selected and recorded.

In the stereoscopic imaging apparatus according to any one of the first to fourth aspects, the image sensor may include a first group of pixels and a second group of pixels for photoelectric conversion each arranged in a matrix shape on a substantially whole surface of an exposure area of the image sensor, the first group of pixels being restricted in a light flux receiving direction to receive only the subject image that has passed through the first area of the photographic optical system, and the second group of pixels being restricted in a light flux receiving direction to receive only the subject image that has passed through the second area of the photographic optical system, and can read out the first image and the second image, respectively, from the first group of pixels and the second group of pixels.

Thus, the stereoscopic imaging apparatus can be made smaller in size than a stereoscopic imaging apparatus using a plurality of image sensors.

According to the present invention, in the stereoscopic imaging apparatus, the parallax between the left viewpoint image and the right viewpoint image can be automatically optimized so that a stereoscopic image most suitable for stereoscopic viewing can be acquired.

DETAILED DESCRIPTION OF THE PREFERRED EMBODIMENTS

Embodiments of a stereoscopic imaging apparatus according to the present invention will be described below with reference to the drawings.

[Overall Configuration of Stereoscopic Imaging Apparatus]

Figure 1:
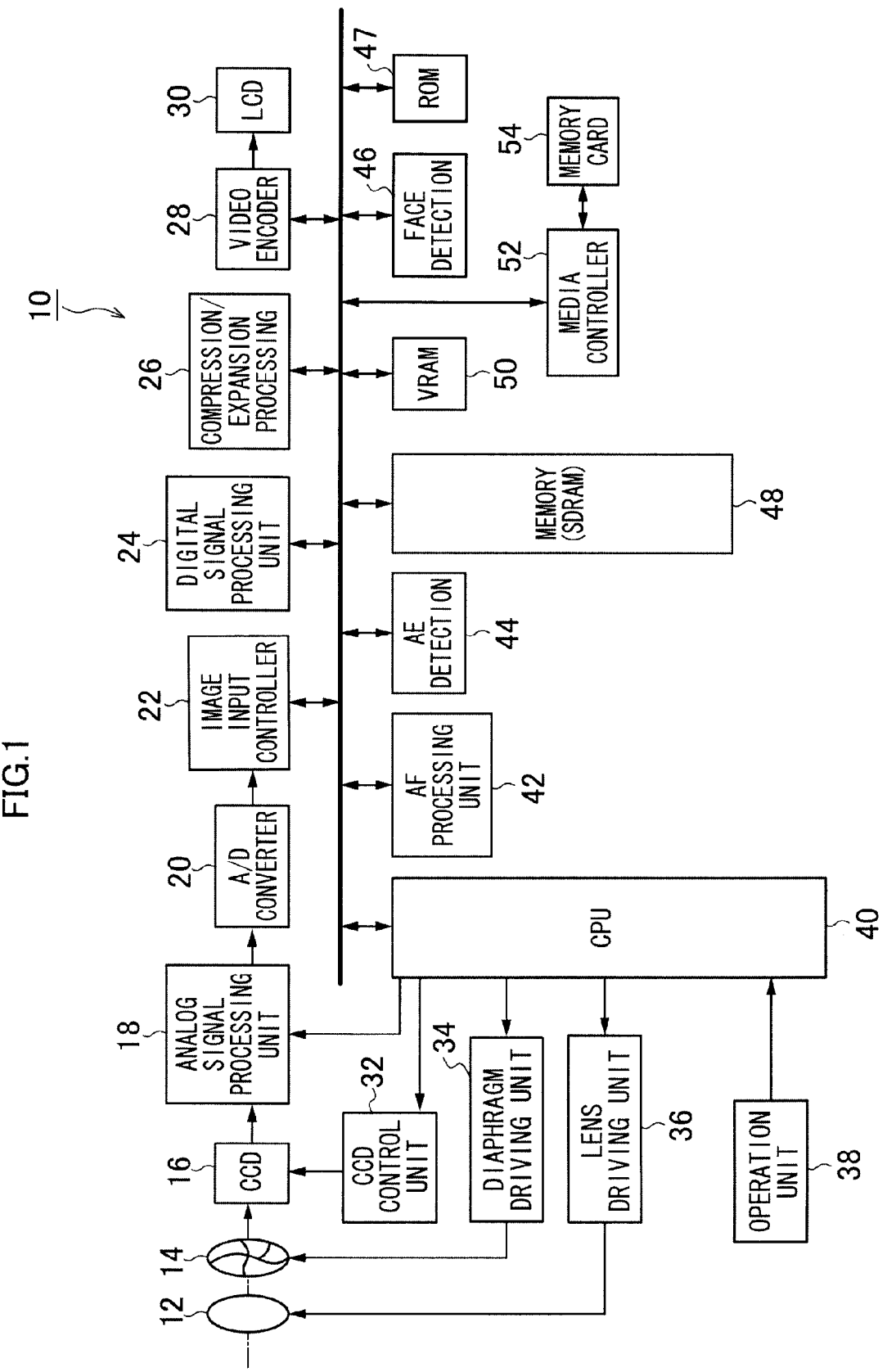
FIG. 1 is a block diagram illustrating an embodiment of a stereoscopic imaging apparatus according to the present invention.

FIG. 1 is a block diagram illustrating an embodiment of a stereoscopic imaging apparatus 10 according to the present invention.

The stereoscopic imaging apparatus 10 records a captured image on a memory card 54, and its overall operation is controlled by a central processing unit (CPU) 40.

The stereoscopic imaging apparatus 10 includes an operation unit 38 such as a shutter button, a mode dial, a reproduction button, a MENU/OK key, a cross key, and a BACK key. A signal from the operation unit 38 is input to the CPU 40. The CPU 40 controls each circuit in the stereoscopic imaging apparatus 10 based on the input signal, and performs lens driving control, diaphragm driving control, photographing operation control, image processing control, image data recording/reproduction control, and display control of a liquid crystal monitor 30 for stereoscopic display, for example.

The shutter button is an operation button for inputting an instruction to start photographing, and includes a two-stroke switch including an S1 switch that is turned on when pressed halfway and an S2 switch that is turned on when fully pressed. A mode dial is a selection unit that selects a two-dimensional (2D) photographing mode, a three-dimensional (3D) photographing mode, an automatic photographing mode, a manual photographing mode, a scene position such as a person, a scene, or a night scene, a macro mode, a moving image mode, or a diaphragm bracketing photographing mode according to the present invention.

The reproduction button is a button for switching to a reproduction mode for displaying a still image or a moving image such as a stereoscopic image (a 3D image) and a planar image (a 2D image), which have been captured and recorded, on the liquid crystal monitor 30. The MENU/OK key is an operation key functioning as both a menu button for issuing an instruction to display a menu on a screen of the liquid crystal monitor 30 and an OK button for issuing an instruction to finalize and execute a selection content. The cross key is an operation unit that inputs instructions in four directions, i.e., up, down, left, and right directions, and functions as a button (a cursor movement operation unit) for selecting an item from a menu screen and issuing an instruction to select various setting items from each menu. An up/down key in the cross key functions as a zoom switch at the time of photographing or a reproduction zoom switch in a reproduction mode, and a left/right key in the cross key functions as a frame scroll (forward/backward scroll) button in the reproduction mode. The BACK key is used when a desired target such as a selected item is deleted, an instruction content is canceled, or an operation state is returned to the previous operation state, for example.

In the photographing mode, image light representing a subject is focused on a light receiving surface of a solid-state image sensor (hereinafter referred to as a "phase-difference charge coupled device (CCD)" 16 serving as a phase-difference image sensor via an photographic optical system (zoom lens) 12 and a diaphragm 14. The photographic optical system 12 is driven by a lens driving unit 36 that is controlled by the CPU 40, and performs focus control, zoom control, or the like. The diaphragm 14 includes five diaphragm blades, for example, and is driven by a diaphragm driving unit 34 that is controlled by the CPU 40, and is controlled in five steps of an aperture value (AV) from F2.8 to F11, for example, on an AV basis.

The CPU 40 controls the diaphragm 14 via the diaphragm driving unit 34 while controlling a charge storage time (shutter speed) in the phase-difference CCD 16 and readout of an image signal from the phase-difference CCD 16 via a CCD control unit 32.

<Example of Configuration of Phase-Difference CCD>

Figure 2:
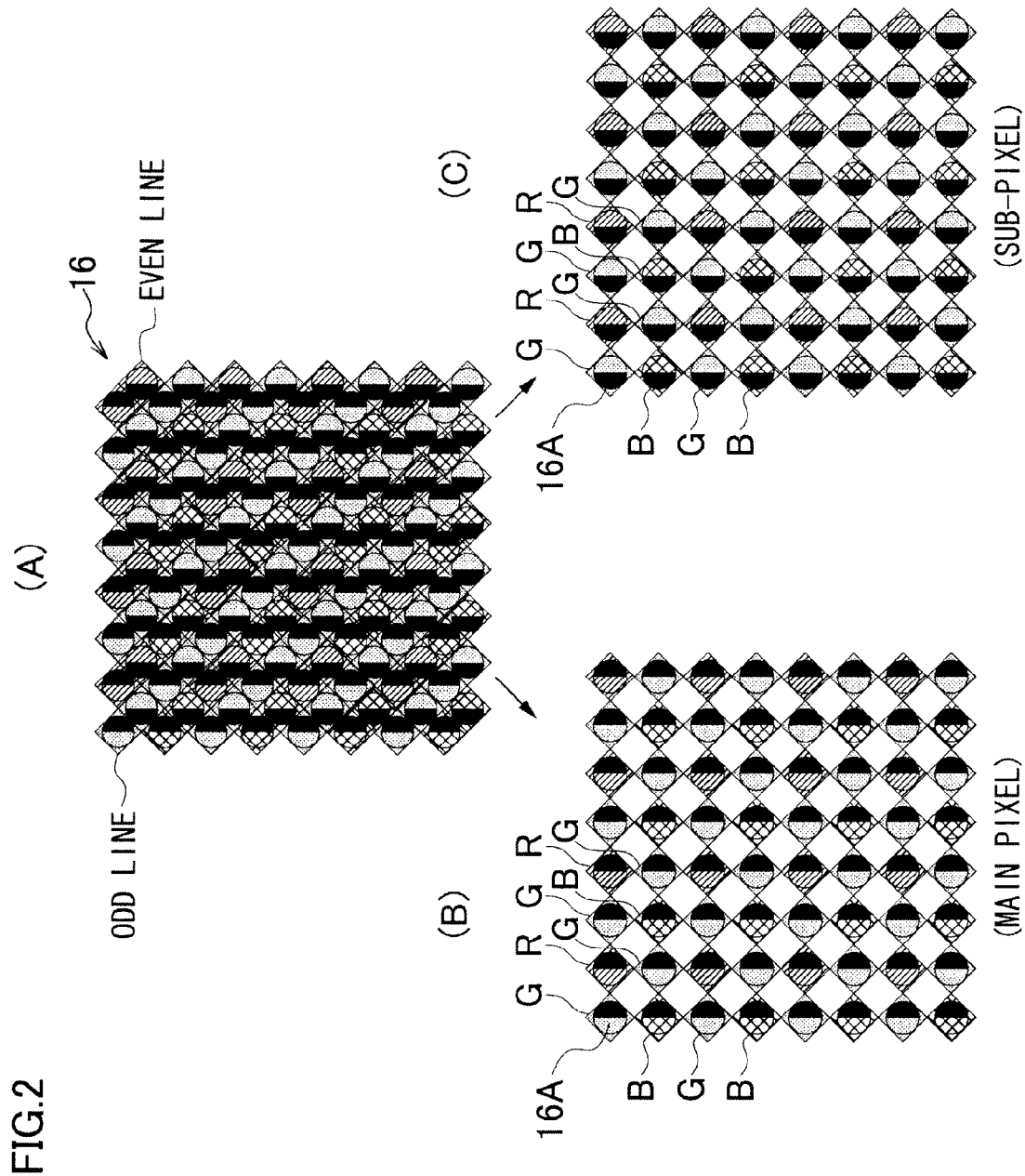
FIG. 2 illustrates an example of a configuration of a phase-difference CCD.

FIG. 2 illustrates an example of a configuration of the phase-difference CCD 16.

The phase-difference CCD 16 has pixels on odd lines (main pixels) and pixels on even lines (sub-pixels), which are each arranged in a matrix shape, so that image signals corresponding to two screens, which have been photoelectrically converted at the main pixels and the sub-pixels, respectively, can be independently read out. The pixels on all the lines of the phase-difference CCD 16 may be sequentially read out, and a main image composed of the pixels on the odd lines and a sub-image composed of the pixels on the even lines may be separated from each other.

As illustrated in FIG. 2, on the odd lines (1, 3, 5, . . . ) of the phase-difference CCD 16, lines in a pixel array of GRGR . . . and a pixel array of BGBG . . . out of the pixels including color filters in R (red), G (green), and B (blue) are alternately provided. On the other hand, on the even lines (2, 4, 6, . . . ) of the phase-difference CCD 16, lines in a pixel array of GRGR . . . and a pixel array of BGBG . . . out of the pixels are alternately provided, like those on the odd lines, while the pixels on the even lines are shifted in a line direction by a half pitch with respect to the pixels on the odd lines.

Figure 3:
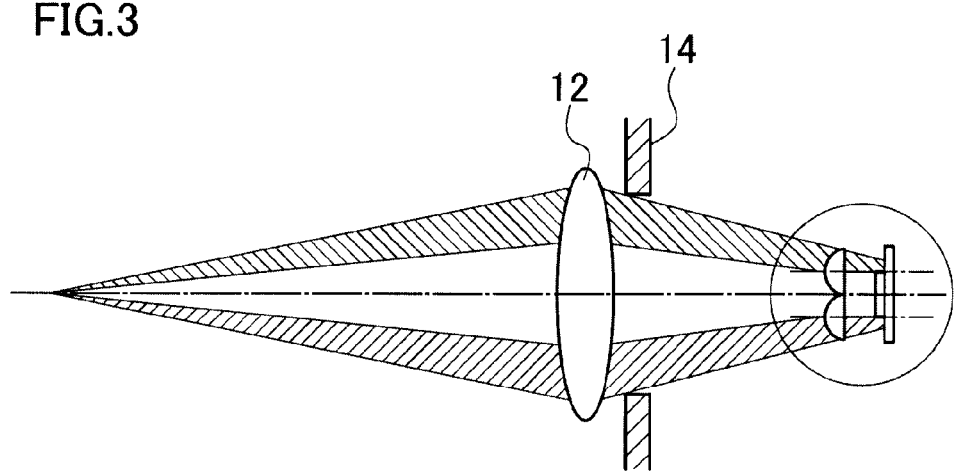
FIG. 3 illustrates a photographic optical system and one main pixel and one sub-pixel of the phase-difference CCD.
Figure 4:
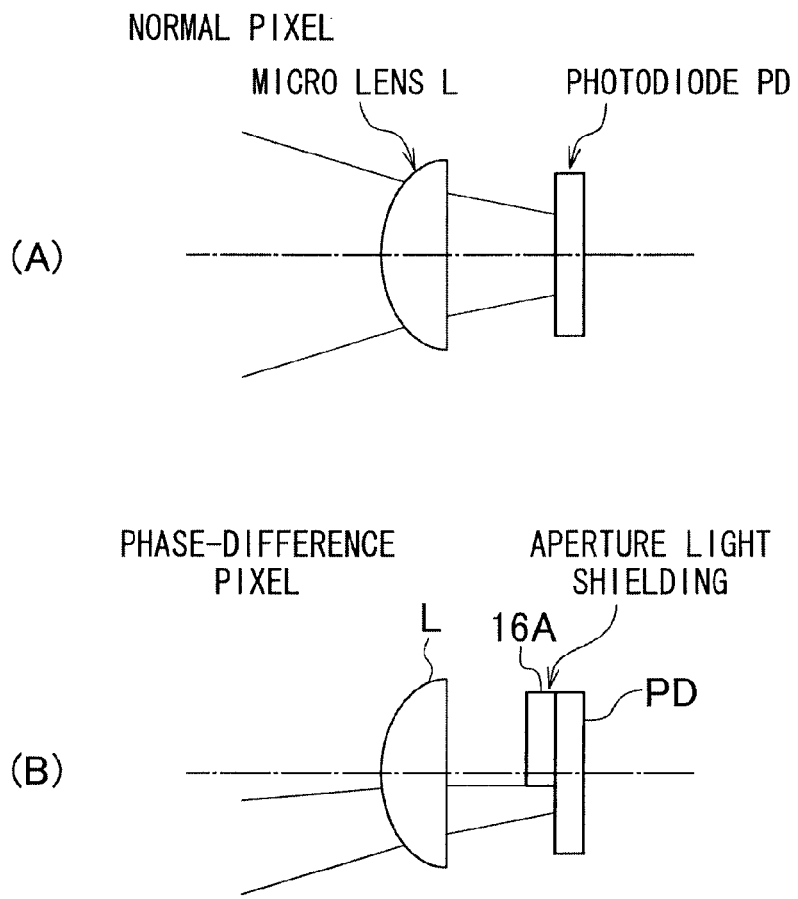
FIG. 4 is enlarged views of a principal part of FIG. 3.

FIG. 3 illustrates the photographic optical system 12, the diaphragm 14, and one main pixel and one sub-pixel of the phase-difference CCD 16, and FIG. 4 are enlarged views of a principal part of FIG. 3.

As illustrated in a portion (A) of FIG. 4, a light flux that passes through an exit pupil is incident on a pixel (a photodiode PD) of a normal CCD via a micro lens L without being restricted.

On the other hand, a light shielding member 16A is formed on a light receiving surface of the main pixel and the sub-pixel (photodiode (PD)) of the phase-difference CCD 16. The light shielding member 16A shields a right half or a left half of the light receiving surface of the main pixel and the sub-pixel. More specifically, the light shielding member 16A functions as a pupil splitting member.

While the phase-difference CCD 16 having the above-mentioned configuration is configured so that the area (the right half or the left half) where the light shielding member 16A restricts the light flux differs depending on the main pixel and the sub-pixel, the present invention is not limited to this. For example, the light shielding member 16A need not be provided, and the micro lens L and the photodiode PD may be relatively shifted in a horizontal direction so that a light flux incident on the photodiode PD is restricted depending on a shifting direction. Alternatively, one micro lens may be provided for two pixels (a main pixel and a sub-pixel) so that a light flux incident on each of the pixels is restricted.

Referring to FIG. 1 again, a signal charge stored in the phase-difference CCD 16 is read out as a voltage signal corresponding to the signal charge based on a readout signal added from the CCD control unit 32. The voltage signal read out of the phase-difference CCD 16 is added to an analog signal processing unit 18. In the analog signal processing unit 18, R, G, and B signals for each pixel are subjected to sample-and-hold processing, are amplified, and are then added to an analog-to-digital (A/D) converter 20. The A/D converter 20 converts the R, G, and B signals sequentially input into digital R, G, and B signals, and outputs the digital R, G, and B signals to an image input controller 22.

A digital signal processing unit 24 subjects a digital image signal input via the image input controller 22 to predetermined signal processing such as offset processing, white balance correction, gain control processing including sensitivity correction, gamma correction processing, concurrent processing, luminance chrominance (YC) processing, and sharpness correction.

In FIG. 1, a known face detection circuit 46 detects the face of a person within a photographic angle of view, and sets an area including the face as an AF area or an automatic exposure (AE) area. A read-only memory (ROM) (electrically erasable programmable read-only memory (EEPROM)) 47 stores a camera control program, defect information of the phase-difference CCD 16, a program diagram, and various correction parameters and a table used for image processing or the like.

As illustrated in portions (B) and (C) of FIG. 2, main image data read out of the main pixels on odd lines of the phase-difference CCD 16 is processed as left viewpoint image data, and sub-image data read out of the sub-pixels on the even lines is processed as right viewpoint image data.

The left viewpoint image data and the right viewpoint image data (3D image data), which have been processed by the digital signal processing unit 24, are input to a video random access memory (VRAM) 50. The VRAM 50 includes an A area and a B area storing the 3D image data representing 3D images corresponding to one frame. In the VRAM 50, the 3D image data representing 3D images corresponding to one frame are alternately rewritten in the A area and the B area. The written 3D image data is read out of an area other than one, where the 3D image data has been rewritten, of the A area and the B area of the VRAM 50. The 3D image data read out of the VRAM 50 is encoded in a video encoder 28, and is output to the liquid crystal monitor 30 for stereoscopic display provided on a back surface of a camera. Thus, a 3D subject image is displayed on a display screen of the liquid crystal monitor 30.

While the liquid crystal monitor 30 is a stereoscopic display unit capable of displaying stereoscopic images (a left viewpoint image and a right viewpoint image) as directional images each having predetermined directionality with a parallax barrier, the present invention is not limited to this. The liquid crystal monitor 30 may be one using a lenticular lens and one enabling a user to individually view a left viewpoint image and a right viewpoint image by wearing dedicated glasses such as polarization glasses or liquid crystal shutter glasses.

When a shutter button in the operation unit 38 is pressed in a first stage (pressed halfway), the phase-difference CCD 16 starts an AF operation and an AE operation, to perform control so that a focus lens within the photographic optical system 12 is at an in-focus position via the lens driving unit 36. Image data output from the A/D converter 20 when the shutter button is pressed halfway is incorporated into an AE detection unit 44.

The AE detection unit 44 integrates G signals on the whole screen or integrates G signals to which different weights are added in a central portion and a peripheral portion of the screen, and outputs their integration value to the CPU 40. The CPU 40 then calculates the brightness (a photographic exposure value (Ev)) of a subject from the integration value input from the AE detection unit 44, determines an aperture value of the diaphragm 14 and an electronic shutter (a shutter speed) of the phase-difference CCD 16 according to a predetermined program diagram based on the photographic Ev, and controls the diaphragm 14 via the diaphragm driving unit 34 based on the determined aperture value while controlling a charge storage time in the phase-difference CCD 16 via the CCD control unit 32 based on the determined shutter speed.

An AF processing unit 42 performs contrast AF processing or phase-difference AF processing. When the contrast AF processing is performed, the AF processing unit 42 extracts high-frequency components of at least one, within a predetermined focus area, of the left viewpoint image data and the right viewpoint image data, and integrates the high-frequency components, to calculate an AF evaluation value representing an in-focus state. AF control is performed by controlling the focus lens within the photographic optical system 12 so that the AF evaluation value reaches its maximum. On the other hand, when the phase-difference AF processing is performed, the AF processing unit 42 detects a phase difference in one, corresponding to a main pixel and a sub-pixel within the predetermined focus area, of the left viewpoint image data and the right viewpoint image data, and finds a defocus amount based on information representing the phase difference. AF control is performed by controlling the focus lens within the photographic optical system 12 so that the defocus amount reaches zero.

When the AE operation and the AF operation end, and the shutter button is pressed in a second stage (fully pressed), image data corresponding to two pieces of images each including a left viewpoint image (a main image) and a right viewpoint image (a sub-image) corresponding to a main pixel and a sub-pixel output from the A/D converter 20 are input to a memory (synchronous dynamic random access memory (SDRAM)) 48 from the image input controller 22 in response to the press, and are temporarily stored therein.

The image data corresponding to the two pieces of images temporarily stored in the memory 48 are read out, as needed, by the digital signal processing unit 24, and are subjected to predetermined signal processing including processing (YC processing) for generating luminance data and color difference data. Image data (YC data), which have been subjected to the YC processing, are stored in the memory 48 again. Then, the YC data corresponding to the two pieces of images are respectively output to a compression/expansion processing unit 26, are subjected to predetermined compression processing such as Joint Photographic Experts Group (JPEG), and are then stored in the memory 48 again.

A multipicture file (an MP file; a file having a format in which a plurality of images are connected to one another) is generated from the YC data (compressed data) stored in the memory 48. The MP file is read out by a media controller 52, and is recorded on the memory card 54.

[First Embodiment]

The stereoscopic imaging apparatus 10 according to a first embodiment of the present invention will be described below.

Figure 5:
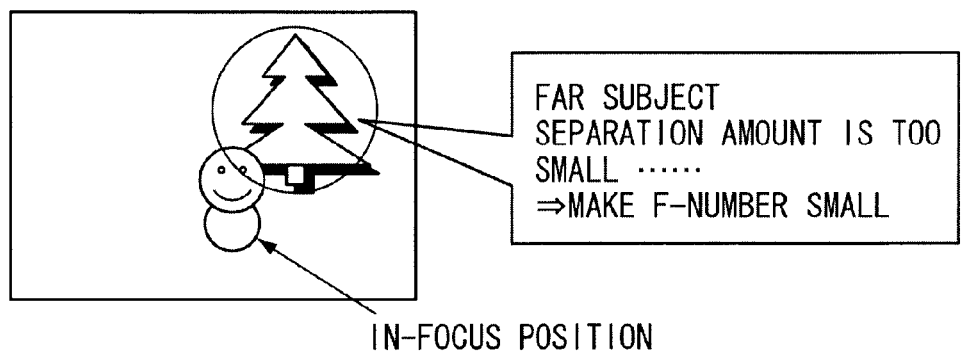
FIG. 5 illustrates images of a 3D image obtained when a far subject and a near subject are captured.
Figure 5:
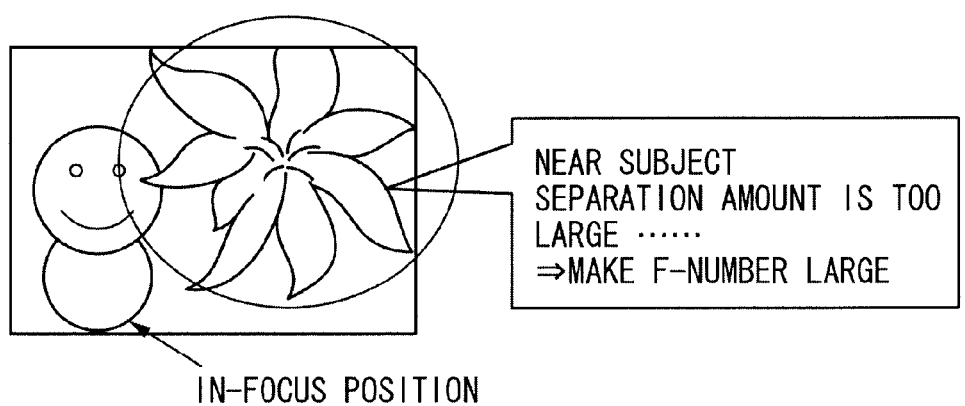

FIG. 5 illustrates images respectively obtained when a far subject and a near subject are captured.

While in FIG. 5, a separation amount (a phase difference) between a main image and a sub-image of a main subject (a person in this example) at an in-focus position is zero, there occurs a phase difference between a main image and a sub-image of a subject corresponding to each of a foreground and a background of the main subject.

The separation amount of the far subject is decreased so that a stereoscopic effect is reduced, as illustrated in a portion (A) of FIG. 5. On the other hand, the separation amount of the near subject is increased so that stereoscopic viewing cannot be performed when beyond a mixing limit, as illustrated in a portion (B) of FIG. 5.

In the first embodiment of the present invention, an F-number of the diaphragm 14 is controlled (i.e., a separation amount is controlled) depending on a subject distance so that a main image and a sub-image for natural stereoscopic viewing, which do not place a burden on the eyes, can be acquired irrespective of whether a subject is far or near.

Figure 6:
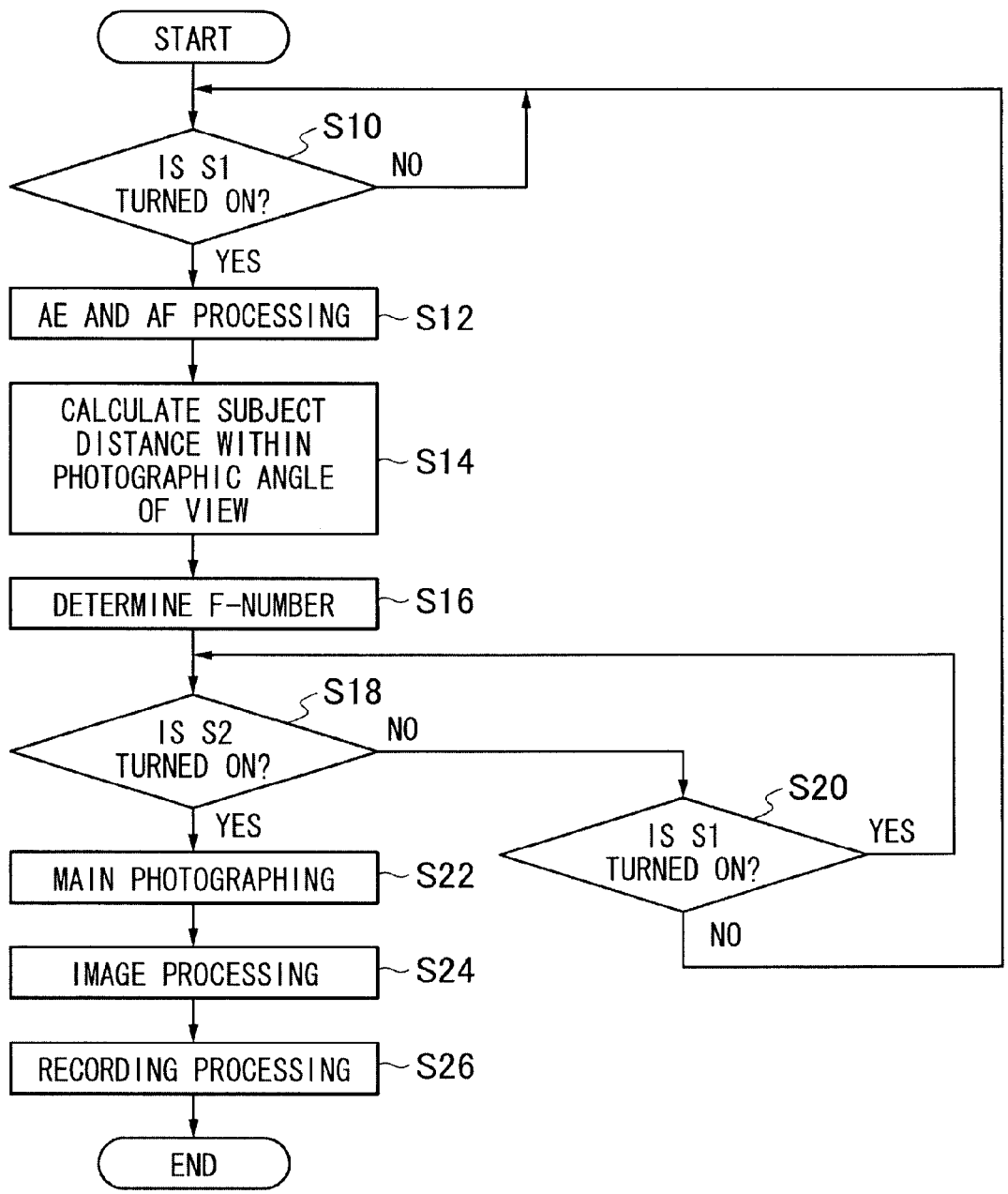
FIG. 6 is a flowchart illustrating a photographing operation of a stereoscopic imaging apparatus according to a first embodiment of the present invention.

FIG. 6 is a flowchart illustrating a photographing operation of the stereoscopic imaging apparatus 10 according to the first embodiment of the present invention.

In FIG. 6, in step S10, the CPU 40 determines whether the shutter button is pressed halfway (the S1 switch is turned on). If the shutter button is pressed halfway (YES in step S10), the processing proceeds to step S12.

In step S12, the CPU 40 calculates the brightness (photographic Ev) of a subject from an integration value input from the AE detection unit 44, causes the AF processing unit 42 to perform contrast AF processing or phase-difference AF processing, and moves the focus lens in the photographic optical system 12, to focus the focus lens on an AF area. In the AF processing in step S12, an F-number of the diaphragm 14 and a shutter speed are not determined, although the photographic Ev is calculated.

In step S14, the CPU 40 then calculates a subject distance within a photographic angle of view. The subject distance may be calculated from information at the time of the AF processing in step S12, or may be calculated by an external focus detection unit (not illustrated). If a plurality of subjects exists within the photographic angle of view, the CPU 40 calculates a distance to a nearest subject or a subject in the AF area (a main subject).

In step S16, the CPU 40 then determines an F-number of the diaphragm 14 based on the subject distance calculated in step S14. The CPU 40 determines the shutter speed from the determined F-number and the calculated photographic Ev.

The F-number is determined depending on the distance to the nearest subject or the main subject so that the shorter the distance is, the larger the F-number becomes (the smaller an aperture value of the diaphragm 14 becomes) and the longer the distance is, the smaller the F-number becomes (the larger the aperture value becomes).

In step S18, the CPU 40 then determines whether the shutter button is fully pressed (the S2 switch is turned on). If the shutter button is not fully pressed (NO in step S18), the processing proceeds to step S20. In step S20, the CPU 40 determines whether the shutter button is pressed halfway (the S1 switch is turned on) again.

On the other hand, if the shutter button is fully pressed (the S2 switch is turned on) (YES in step S18), the processing proceeds to step S22. In step S22, the CPU 40 performs main photographing (main exposure) under conditions such as the F-number and the shutter speed, which have been determined in step S16. In step S24, the CPU 40 causes the digital signal processing unit 24 to process each of a main image and a sub-image, which have been read out of the phase-difference CCD 16 at the time of the main photographing. In step S26, the CPU 40 causes the compression/expansion processing unit 26 to compress each of the two images, i.e., the main image and the sub-image, then stores the images in an MP file, and records the images on the memory card 54.

[Second Embodiment]

Figure 7:
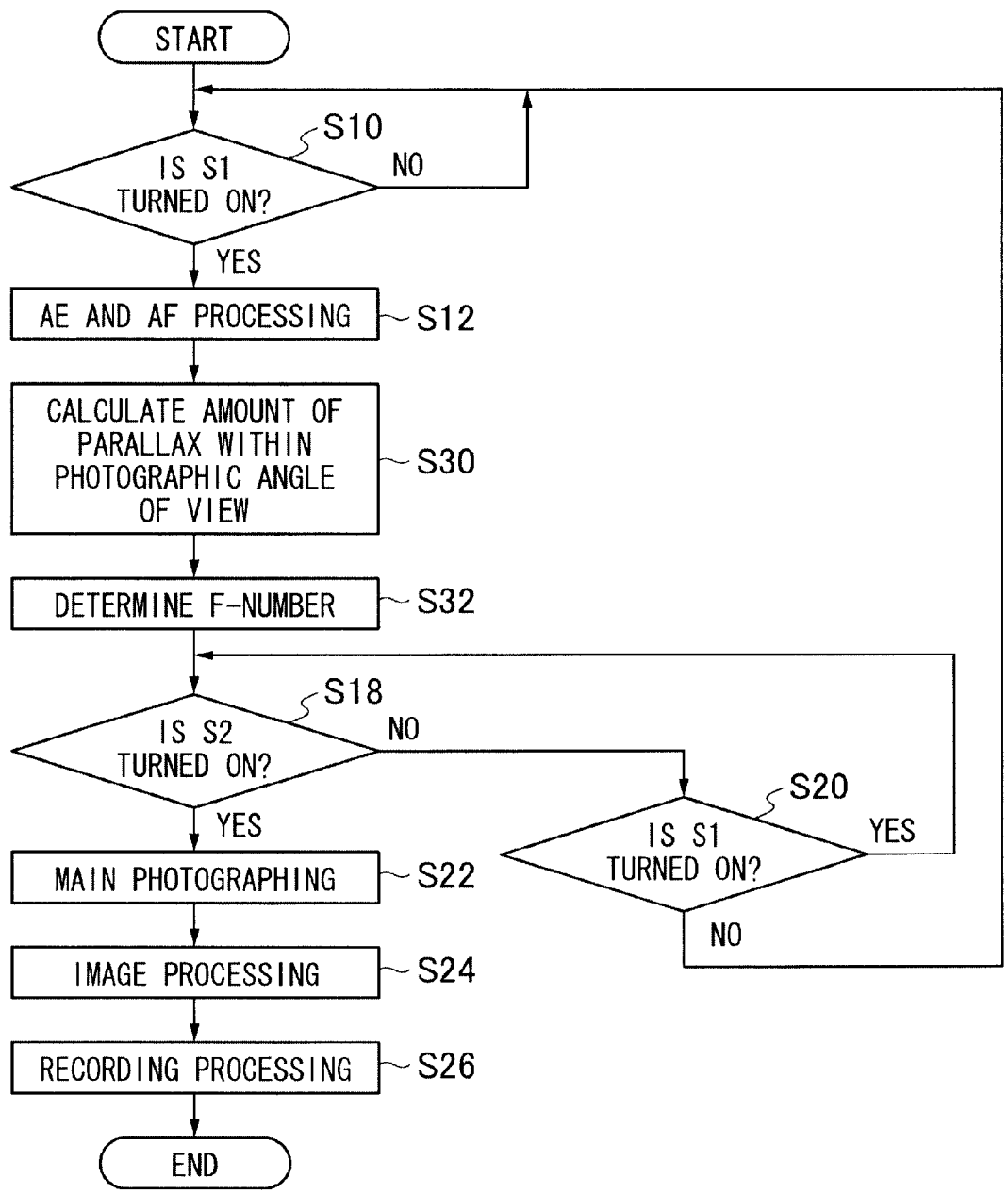
FIG. 7 is a flowchart illustrating a photographing operation of a stereoscopic imaging apparatus according to a second embodiment of the present invention.

FIG. 7 is a flowchart illustrating a photographing operation of a stereoscopic imaging apparatus 10 according to a second embodiment of the present invention. Steps common to those in the first embodiment illustrated in FIG. 6 are assigned the same step numbers, and hence detailed description thereof is not repeated.

The second embodiment differs from the first embodiment in that processes in steps S30 and S32 are performed, as illustrated in FIG. 7, in place of the processes in steps S14 and S16 illustrated in FIG. 6.

In step S30, a CPU 40 calculates an amount of parallax at a corresponding point between a main image and a sub-image, which have been acquired when a shutter button is pressed halfway. The amount of parallax is calculated by finding, based on one of the images (e.g., the main image), a corresponding pixel on the other image (the sub-image). As a method for finding the corresponding pixel, a block matching method, for example, can be used. A parallax map representing amounts of parallax corresponding to one screen is generated by finding a parallax between each of all the pixels on the main image and the corresponding pixel on the sub-image.

In step S32, the CPU 40 finds a separation amount (an amount of parallax) of a subject within a photographic angle of view from the parallax map, which has been generated in the above-mentioned manner, to determine an F-number of a diaphragm 14 at the time of main photographing based on the amount of parallax.

Figure 8:
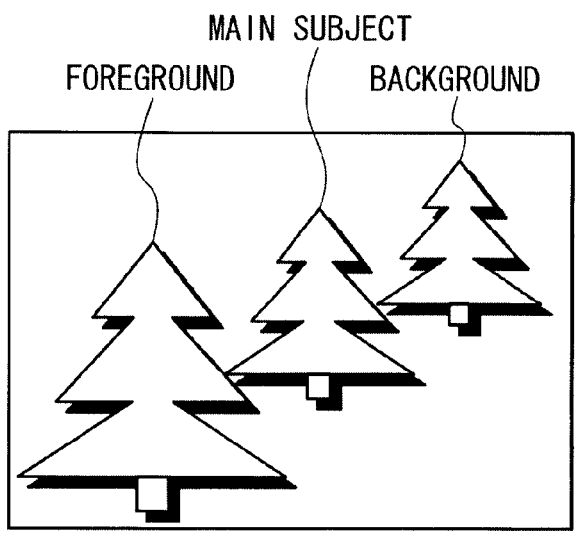
FIG. 8 illustrates an amount of parallax of a subject within a photographic angle of view.

When respective amounts of parallax of a main subject, a foreground, and a background within the photographic angle of view are found, as illustrated in FIG. 8, the respective amounts of parallax of the foreground and the background can be found relative to the amount of parallax of the main subject (an in-focus position=an amount of parallax 0). Since the amount of parallax of the foreground and the amount of parallax of the background differ in signs, the whole amount of parallax is the sum of respective absolute values of the amount of parallax of the foreground and the amount of parallax of the background. In step S32, described above, the F-number of the diaphragm 14 at the time of the main photographing is determined so that the whole amount of parallax reaches a previously set amount of parallax (a predetermined amount of parallax in which an appropriate stereoscopic effect is obtained).

If the main subject is a nearest subject, the amount of parallax of the background is directly the whole amount of parallax. In a scene having a foreground, the F-number of the diaphragm 14 may be determined so that an amount of parallax of the foreground reaches a predetermined amount of parallax. The amount of parallax of the background is associated with a sense of depth in 3D display, while the amount of parallax of the foreground is associated with an amount of projection in 3D display, which is important to give a more stereoscopic effect.

When a shutter is also determined by the F-number, which has been determined in the above-mentioned manner, and the shutter button is then fully pressed, the processing proceeds to step S22. In step S22, the CPU 40 performs main photographing under the above-mentioned determined exposure conditions (the F-number and the shutter speed).

According to the second embodiment of the present invention, the F-number of the diaphragm 14 is controlled so that an amount of parallax of the subject becomes appropriate depending on an amount of parallax thereof before photographing. Therefore, a main image and a sub-image for natural stereoscopic viewing can be acquired.

<Modified Example 1 of Second Embodiment>

While a main image and a sub-image are previously acquired to calculate an amount of parallax of a subject before main photographing, the diaphragm 14 at this time is opened. Thus, the maximum amount of parallax that is controllable can be grasped, the accuracy of parallax adjustment at the time of the main photographing can be increased, and the amount of parallax can be calculated using a bright image.

<Modified Example 2 of Second Embodiment>

The amount of parallax may be uncontrollable to be a previously set predetermined amount of parallax even if an F-number is changed because a parallax becomes too large in the case of macro photographing and becomes too small in the case of a scene.

Figure 9:
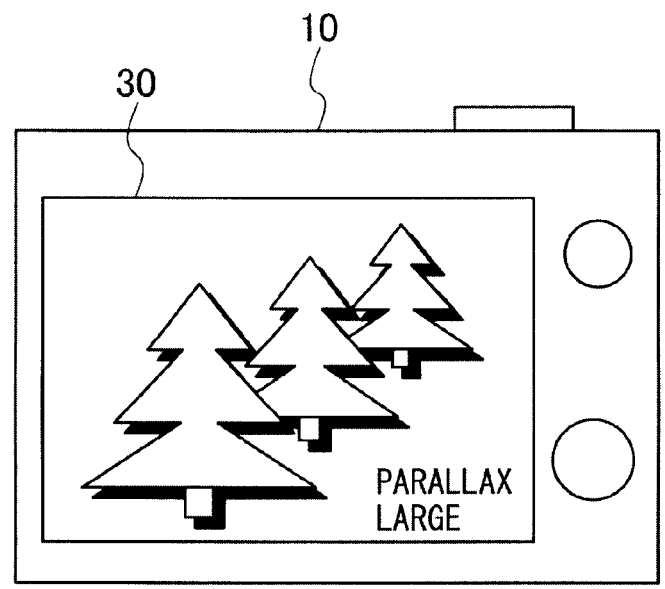
FIG. 9 illustrates a stereoscopic imaging apparatus having a liquid crystal monitor provided on its back surface.

If a parallax between images, which are captured in main photographing, is not in a predetermined range even if an F-number is controlled from an amount of parallax previously grasped, a warning (Parallax Large, Parallax Small), for example, is displayed on a liquid crystal monitor 30 on a back surface of the stereoscopic imaging apparatus 10, as illustrated in FIG. 9.

A user can capture an appropriate 3D image by displaying the warning to interrupt photographing and changing a zoom magnification, a photographing position, or the like. The main photographing may be directly performed even if the warning is displayed.

[Third Embodiment]

Figure 10:
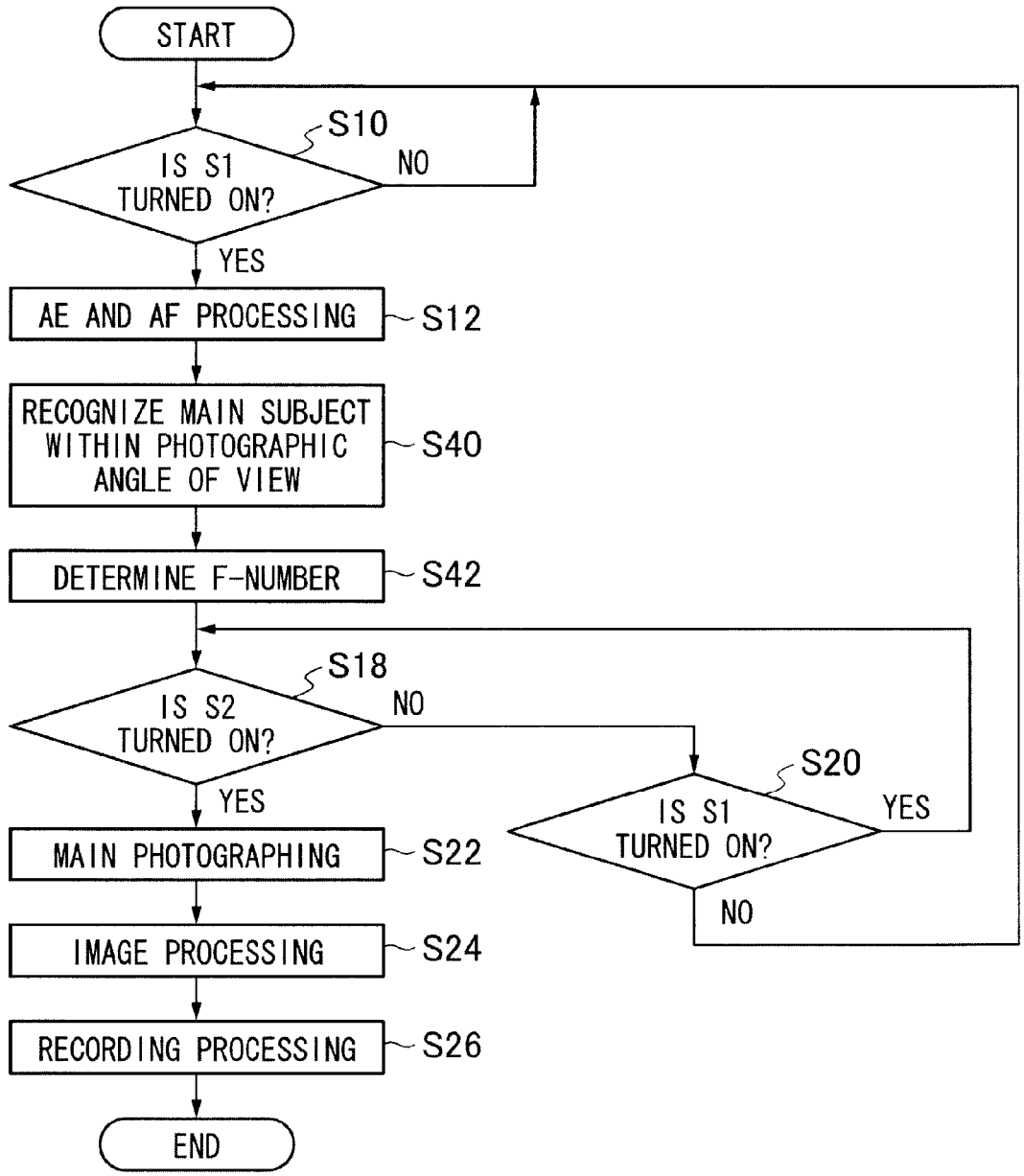
FIG. 10 is a flowchart illustrating a photographing operation of a stereoscopic imaging apparatus according to a third embodiment of the present invention.

FIG. 10 is a flowchart illustrating a photographing operation of a stereoscopic imaging apparatus 10 according to a third embodiment of the present invention. Steps common to those in the first embodiment illustrated in FIG. 6 are assigned the same step numbers, and hence detailed description thereof is not repeated.

The third embodiment differs from the first embodiment in that processes in steps S40 and S42 are performed, as illustrated in FIG. 10, in place of the processes in steps S14 and S16 illustrated in FIG. 6.

In step S40, a CPU 40 recognizes a main subject within a photographic angle of view based on an image acquired when a shutter button is pressed halfway. A stereoscopic imaging apparatus 10 according to the present embodiment includes a face detection circuit 46 for detecting the face of a person within the photographic angle of view. While the stereoscopic imaging apparatus 10 can recognize a person as a main subject, therefore, it can recognize a main subject such as a scene or a building by using a known object recognition technique.

In step S42, the CPU 40 determines an F-number of a diaphragm 14 depending on the main subject, which has been recognized in step S40.

Figure 11:
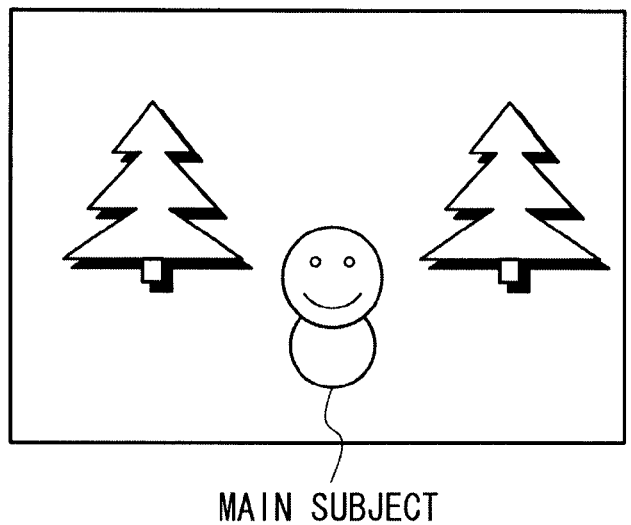
FIG. 11 illustrates the third embodiment of the present invention.

If a person is recognized as a main subject within a photographic angle of view (a subject at an in-focus position), as illustrated in FIG. 11, an F-number is determined so that a parallax becomes larger so that a stereoscopic effect of the person can be emphasized. If a scene is recognized as a main subject, it is predicted that a subject distance is long and a parallax is small. Therefore, an F-number is determined so that the parallax becomes larger. If a flower is recognized as a main subject, it is considered that a subject distance is short and a parallax is larger. Therefore, an F-number is determined so that the parallax becomes smaller.

In the third embodiment, the F-number may be determined by previously storing for each type of main subject an F-number corresponding to the main subject in a ROM 47 and reading out the F-number from the ROM 47 depending on a main subject recognized before photographing or by changing an F-number determined according to a predetermined program diagram in a direction in which a parallax is increased or a direction in which a parallax is decreased in step S12.

According to the third embodiment of the present invention, depending on a main subject recognized before photographing, images, between which there is a parallax suitable for the main subject, can be captured.

[Fourth Embodiment]

Figure 12:
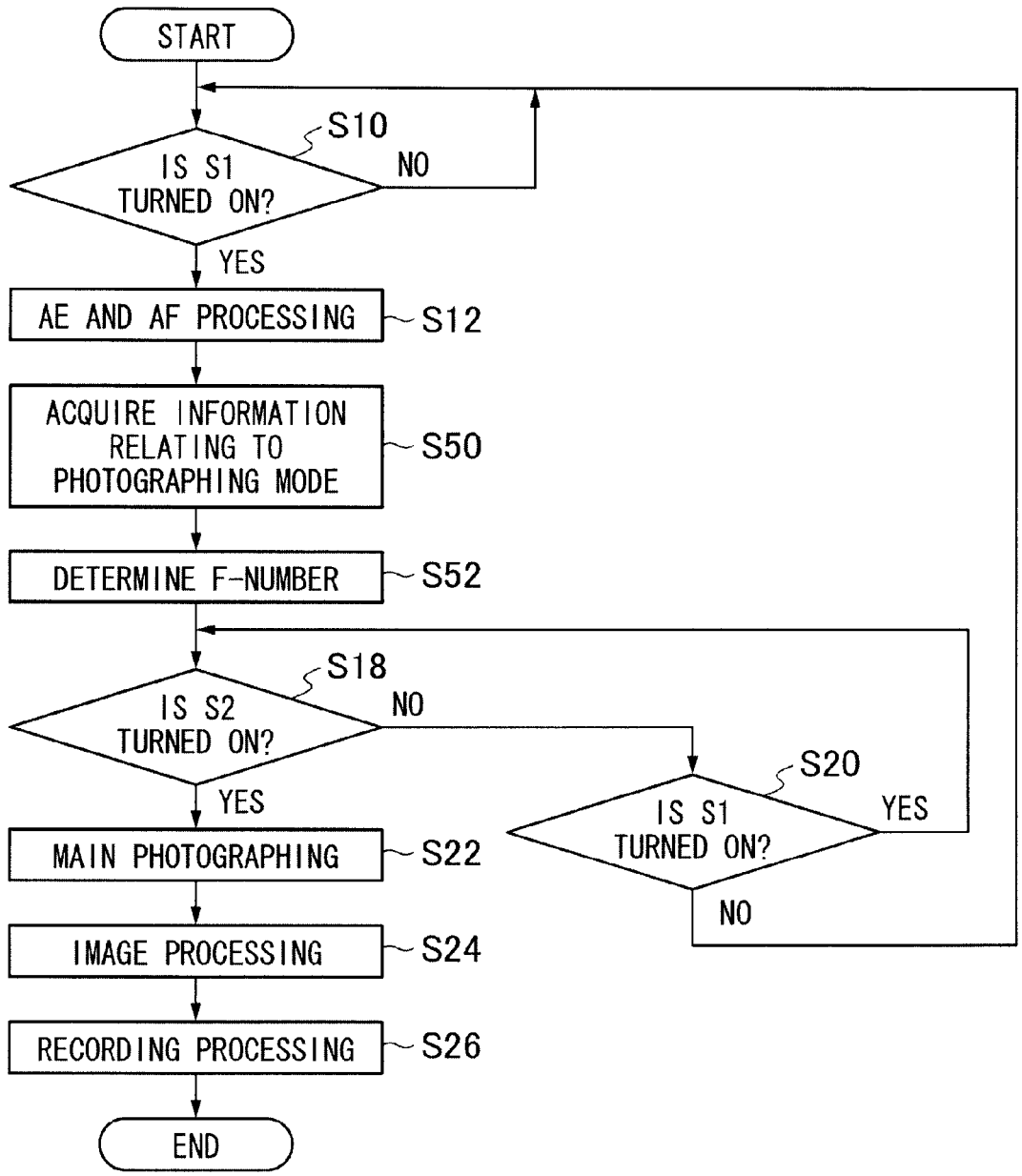
FIG. 12 is a flowchart illustrating a photographing operation of a stereoscopic imaging apparatus according to a fourth embodiment of the present invention.

FIG. 12 is a flowchart illustrating a photographing operation of a stereoscopic imaging apparatus 10 according to a fourth embodiment of the present invention. Steps common to those in the third embodiment illustrated in FIG. 10 are assigned the same step numbers, and hence detailed description thereof is not repeated.

The fourth embodiment differs from the third embodiment in that processes in steps S50 and S52 are performed, as illustrated in FIG. 12, in place of the processes in steps S40 and S42 illustrated in FIG. 10.

In step S50, a CPU 40 acquires information relating to a photographing mode selected by a mode dial in an operation unit 38 before photographing. The acquired information relating to the photographing mode includes information relating to a macro mode and a moving image mode in addition to a person mode and a scene mode depending on selection of scene positions such as a person, a scene, and a night scene.

In step S52, the CPU 40 determines an F-number of a diaphragm 14 according to the information relating to the photographing mode, which has been acquired in step S50.

More specifically, an F-number is determined so that a parallax becomes larger, like in the third embodiment, if a person mode for photographing a person or a scene mode for photographing a scene is set or is determined so that a parallax becomes smaller if a macro mode is set. An F-number is set so that a parallax becomes smaller if a 3D moving image mode is set, not to tire the eyes of a user when the user watches a 3D moving image.

According to the fourth embodiment of the present invention, depending on a photographing mode acquired before photographing, images, between which there is a parallax suitable for the photographing mode, can be captured.

[Fifth Embodiment]

A stereoscopic imaging apparatus 10 according to a fifth embodiment performs diaphragm bracketing photographing, described below, when a diaphragm bracketing photographing mode is selected with a mode dial in an operation unit 38.

The diaphragm bracketing photographing changes, when continuously performed two or more times by performing shutter release once, an F-number every time the photographing is performed. The diaphragm bracketing photographing differs from general automatic bracketing photographing (an amount of exposure is changed) in that an amount of exposure is not changed, although the F-number is changed every time the photographing is performed.

Figure 13:
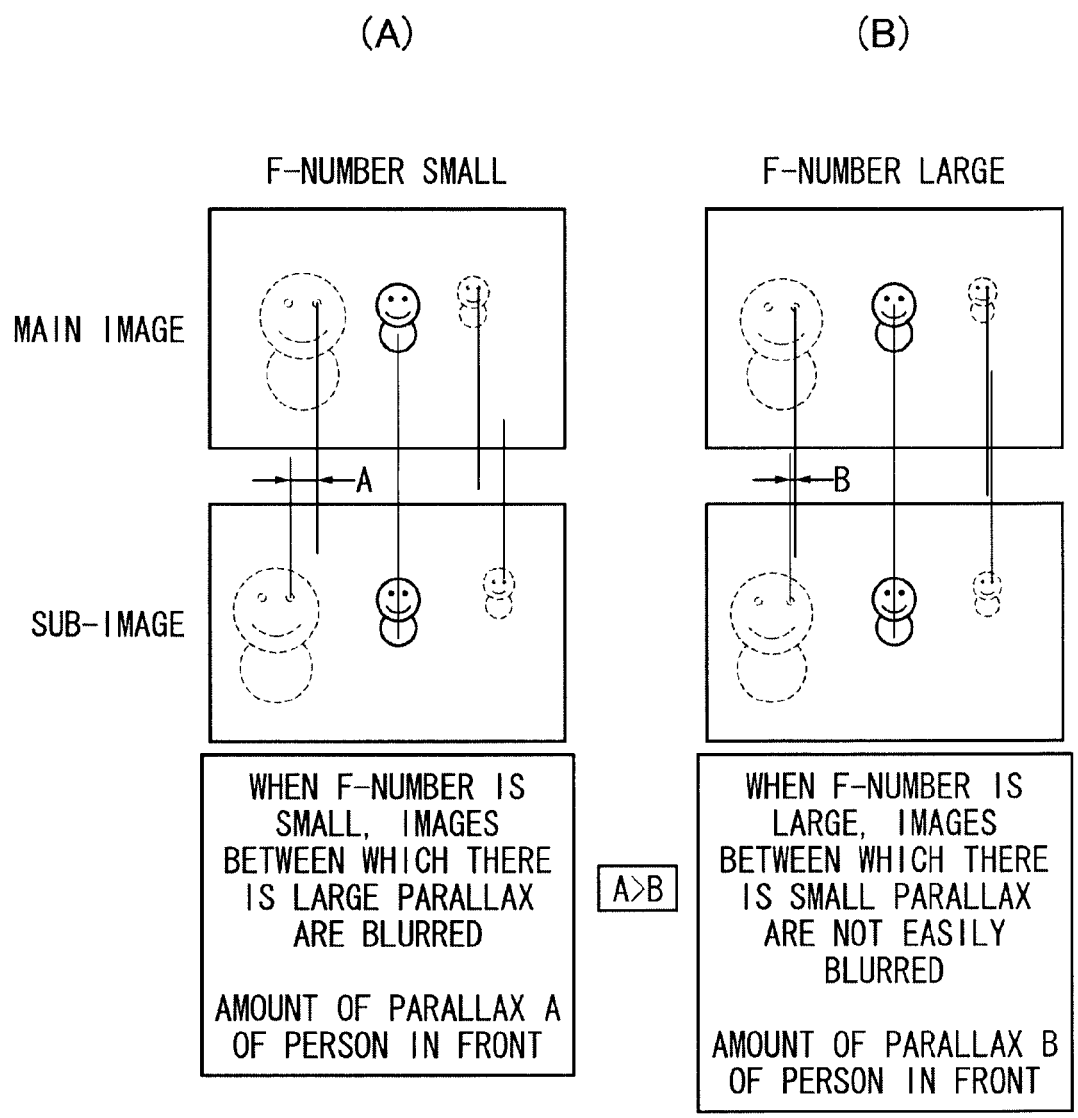
FIG. 13 illustrates a fifth embodiment of the present invention.

As illustrated in portions (A) and (B) of FIG. 13, an amount of parallax A at a corresponding point (the right eye of a person in front) between a main image and a sub-image having a small F-number (being bright) is larger than an amount of parallax B at a corresponding point (the left eye of a person in front) between a main image and a sub-image having a large F-number (being dark) (A>B). On the other hand, a subject at a position other than an in-focus position is easily blurred in the images having a small F-number, and a subject at a position other than an in-focus position is not easily blurred in the images having a large F-number.

In the fifth embodiment, the images are used to generate images, between which there is a large parallax and in which a subject at a position other than an in-focus position is not easily blurred.

Figure 14:
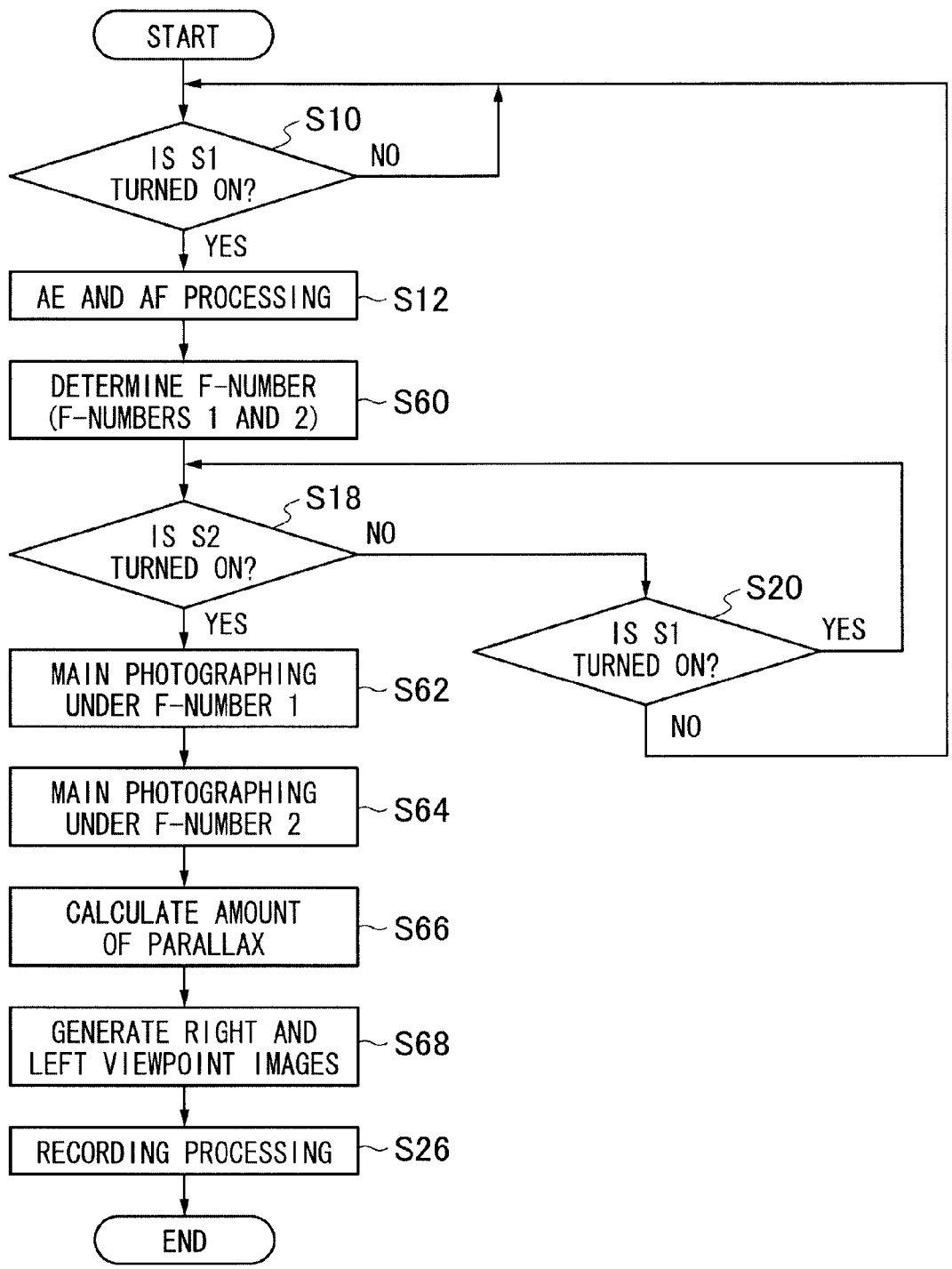
FIG. 14 is a flowchart illustrating a photographing operation of a stereoscopic imaging apparatus according to the fifth embodiment of the present invention.

FIG. 14 is a flowchart illustrating a photographing operation of a stereoscopic imaging apparatus 10 according to a fifth embodiment of the present invention, illustrating a photographing operation in the diaphragm bracketing photographing mode. Steps common to those in the first embodiment illustrated in FIG. 6 are assigned the same step numbers, and hence detailed description thereof is not repeated.

In FIG. 14, in step S60, a CPU 40 determines two F-numbers (an F-number 1 and an F-number 2) at the time of diaphragm bracketing photographing. When the F-number 1 is less than the F-number 2, a parallax between images captured using the F-number 1 becomes large, and a parallax between images captured using the F-number 2 becomes small.

While the F-number 1 can be a full-aperture value of a diaphragm 14, and the F-number 2 can be a minimum aperture value of the diaphragm 14, the present invention is not limited to this. The F-number 1 may be determined using the above-mentioned methods described in the first to fourth embodiments. The F-number 2 may be determined to be not only the minimum aperture value of the diaphragm 14 but also an F-number that is as large as possible based on the brightness of a subject (a subject luminance). The diaphragm bracketing photographing is not limited to two times of photographing using two types of F-numbers. For example, the diaphragm bracketing photographing may be three or more times of photographing using three or more types of F-numbers.

In step S60, the CPU 40 determines shutter speeds V1 and V2 based on the photographic Ev, which has been measured in step S12, respectively, as it determines the F-numbers 1 and 2 so that an amount of exposure at the time of main photographing becomes constant.

If a shutter button is fully pressed (the S2 switch is turned on) (YES in step S18), the processing proceeds to step S62. In step S62, the CPU 40 performs main photographing under exposure conditions such as the F-number 1 and the shutter speed V1, to acquire a first main image and a first sub-image from a phase-difference CCD 16. In step S64, the CPU 40 then performs main photographing under exposure conditions such as the F-number 2 and the shutter speed V2, to acquire a second main image and a second sub-image from the phase-difference CCD 16. An interval between two times of photographing is preferably as short as possible. The respective orders of step S62 and step S64 may be reversed.

In step S66, the CPU 40 then calculates respective amounts of parallax between the first main and sub-images and between the second main and sub-images, which have been acquired in steps S62 and S64.

The amount of parallax is calculated by finding, based on one of images (e.g., a main image), a corresponding pixel on the other image (a sub-image). As a method for finding the corresponding pixel, a block matching method, for example, can be used. A parallax between each of all pixels on the main image and a corresponding pixel on the sub-image is found, to generate a parallax map representing amounts of parallax corresponding to one screen. Thus, a first parallax map representing large amounts of parallax and a second parallax map representing small amounts of parallax can be generated.

In step S68, the CPU 40 then generates images (left and right viewpoint images), between which there is a large parallax and in which a subject at a position other than an in-focus position is not easily blurred, using the second main and sub-images and the first and second parallax maps. A method for generating the left and right viewpoint images will be described with reference to FIG. 15.

Figure 15:
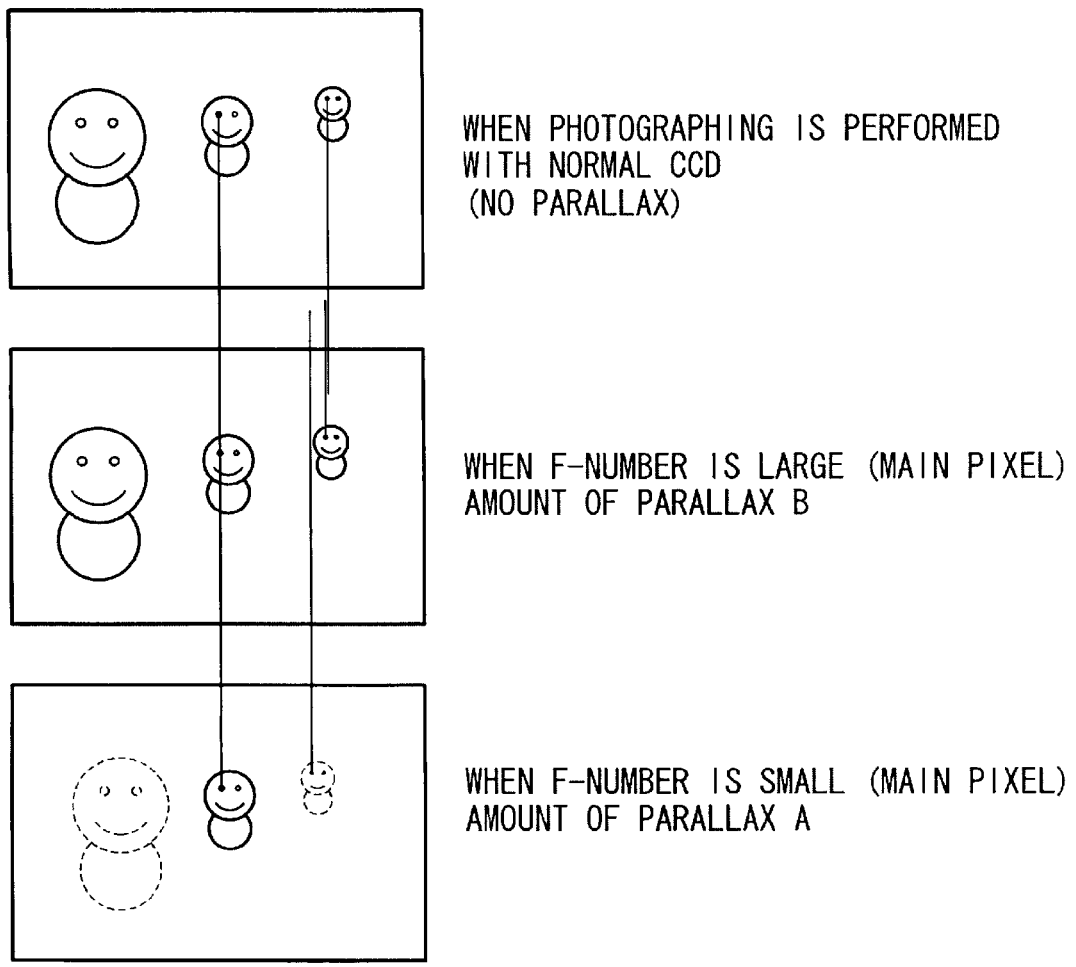
FIG. 15 illustrates a method for generating left and right viewpoint images according to the fifth embodiment of the present invention.

In the case of images that have been subjected to AF control so that a person at the center is in focus, as illustrated in FIG. 15, a parallax does not occur (a parallax is zero) for the person. As illustrated in FIG. 15, a position of the right eye of the person at the center matches that in an image captured by a normal CCD (a CCD other than the phase-difference CCD 16 according to the present invention) irrespective of an F-number.

On the other hand, the smaller the F-number is, the more greatly the position of the right eye of a person in the back is shifted (an amount of parallax is increased).

Letting A be an amount of parallax at a position of the right eye of a person in the back between a first main image and a first sub-image having a small F-number (being bright) and letting B be an amount of parallax at a position of the right eye of the person in the back between a second main image and a second sub-image having a large F-number (being dark), the position of the right eye in the images having a large F-number matches the position of the right eye in the images having a small F-number when moved by (A−B)/2. This is performed over all pixels on the second main image so that the second main image can have the same parallax from the second sub-image as that of the first main image. The amounts of parallax A and B can be respectively read out of the first and second parallax maps.

Similar processing is performed for the second sub-image so that the second sub-image can have the same parallax from the second main image as that of the first sub-image.

Thus, images (left and right viewpoint images), which uses the second main and sub-images in which a subject is hardly blurred and between which there is the same parallax as the large parallax between the first main and sub-images, can be generated.

Referring to FIG. 14 again, in step S26, the CPU 40 records the left and right viewpoint images, which have been generated in the above-mentioned manner, on a memory card 54.

Three 3D images, i.e., not only the generated left and right viewpoint images but also the first main and sub-images and the second main and sub-images may be recorded on the memory card 54. Alternatively, only the first main and sub-images and the second main and sub-images may be recorded at the time of diaphragm bracketing photographing, and the left and right viewpoint images may be generated and recorded at the time of subsequent reproduction.

<Modified Example of Fifth Embodiment>

In this modified example, an amount of parallax stored in a first parallax map representing large amounts of parallax, which has been calculated in step S66 illustrated in FIG. 14, is restricted not to exceed a predetermined amount of parallax (e.g., a reference value at which a parallax in a projection direction is restricted and a reference value at which a parallax in a depth direction is restricted).

The amount of parallax stored in the first parallax map is thus restricted not to exceed the predetermined amount of parallax so that left and right viewpoint images, between which there is a too large parallax, are not generated.

[Sixth Embodiment]

Figure 16:
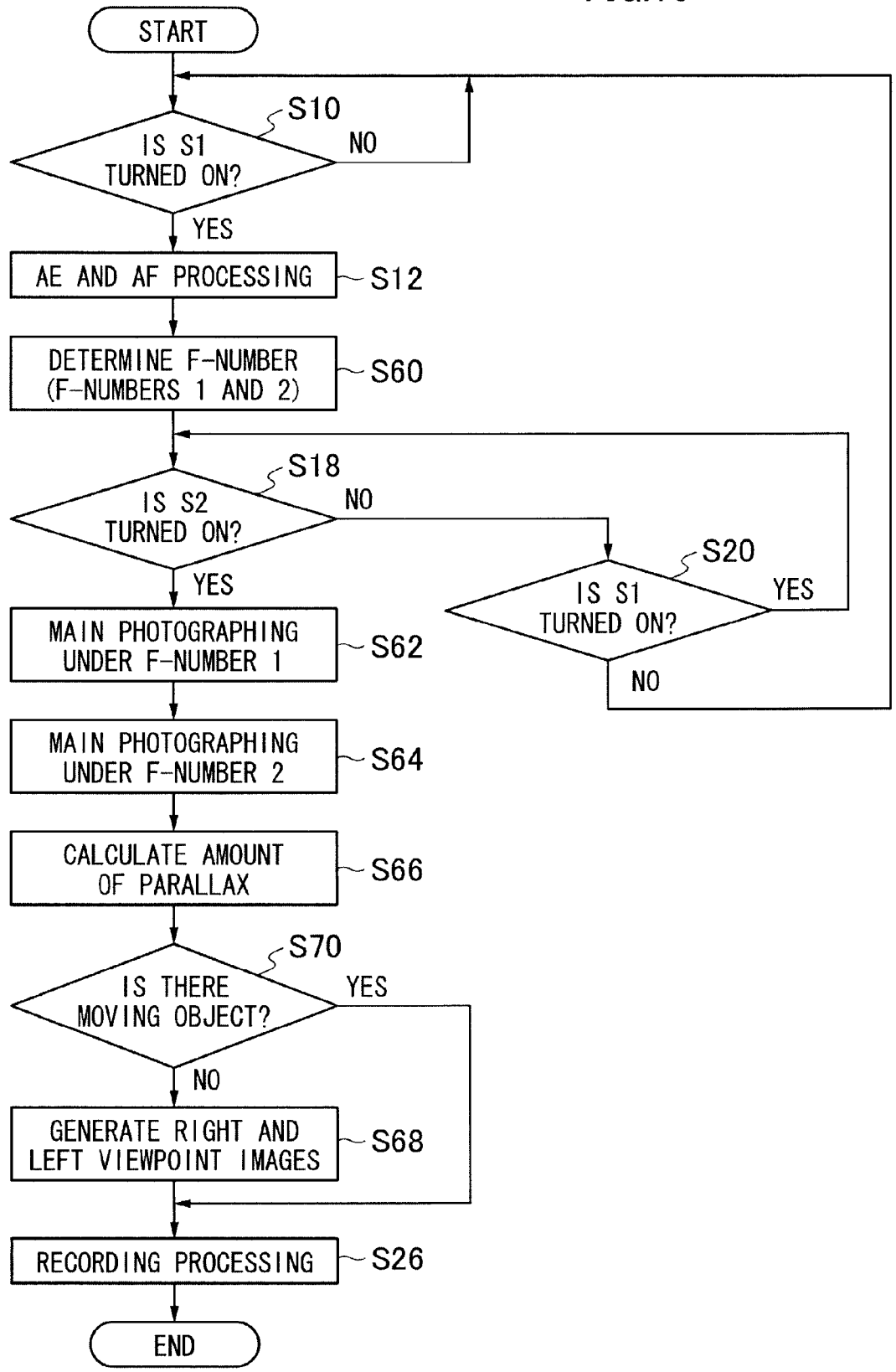
FIG. 16 is a flowchart illustrating a photographing operation of a stereoscopic imaging apparatus according to a sixth embodiment of the present invention.

FIG. 16 is a flowchart illustrating a photographing operation of a stereoscopic imaging apparatus 10 according to a sixth embodiment of the present invention. Steps common to those in the fifth embodiment illustrated in FIG. 14 are assigned the same step numbers, and hence detailed description thereof is not repeated.

The sixth embodiment differs from the fifth embodiment in that a process in step S70 is added, as illustrated in FIG. 16, between the processes in steps S66 and S68 illustrated in FIG. 14.

In step S70, a CPU 40 determines whether a change in a parallax on a first parallax map and a change in a parallax on a second parallax map, which have been generated in step S66, tend to differ. If the changes in the parallaxes tend to differ (YES in step S70), it is determined that a moving object exists.

More specifically, when a difference value between amounts of parallax on the first parallax map and the second parallax map exceeds an upper-limit value or a lower-limit value of a defined range determined based on an F-number and an amount of parallax or a subject distance.

If an amount of parallax at a certain pixel is n pixels on the first parallax map, it can be found to be m pixels on the second parallax map in which an F-number has been changed by calculation from the F-number and the amount of parallax or the subject distance. If a difference between the amount of parallax at the certain pixel on the first parallax map and the amount of parallax at the corresponding pixel on the second parallax map exceeds an upper-limit value or a lower-limit value of a defined range determined based on a difference (n−m) between the amounts of parallax found in the above-mentioned manner, therefore, it can be determined that a moving object exists. Calculation of the amount of parallax on the other parallax map, which is calculated from the F-number and the amount of parallax or the subject distance, can improve accuracy by using the amount of parallax on the first parallax map representing a small F-number. Since a moving object has a certain degree of area, the detection accuracy of the moving object can be improved by determining that the moving object exists if a plurality of or more pixels, which are determined to compose the moving object, continuously exist.

If it is determined that the moving object exists within a photographic angle of view (YES in step S70), the processing proceeds to step S28 after jumping step S68 in which the CPU 40 generates the left and right viewpoint images (stopping generating the right and left viewpoint images). In this case, in step S26, the CPU 40 records the first main and sub-images or the second main and sub-images.

More specifically, there is a time difference between two times of photographing by diaphragm bracketing photographing. If a moving object exists within a photographic angle of view, therefore, good left and right viewpoint images cannot be generated. If the moving object is detected, therefore, the CPU 40 stops generating the left and right viewpoint images so that images unsuitable for stereoscopic viewing are not generated.

[Seventh Embodiment]

Figure 17:
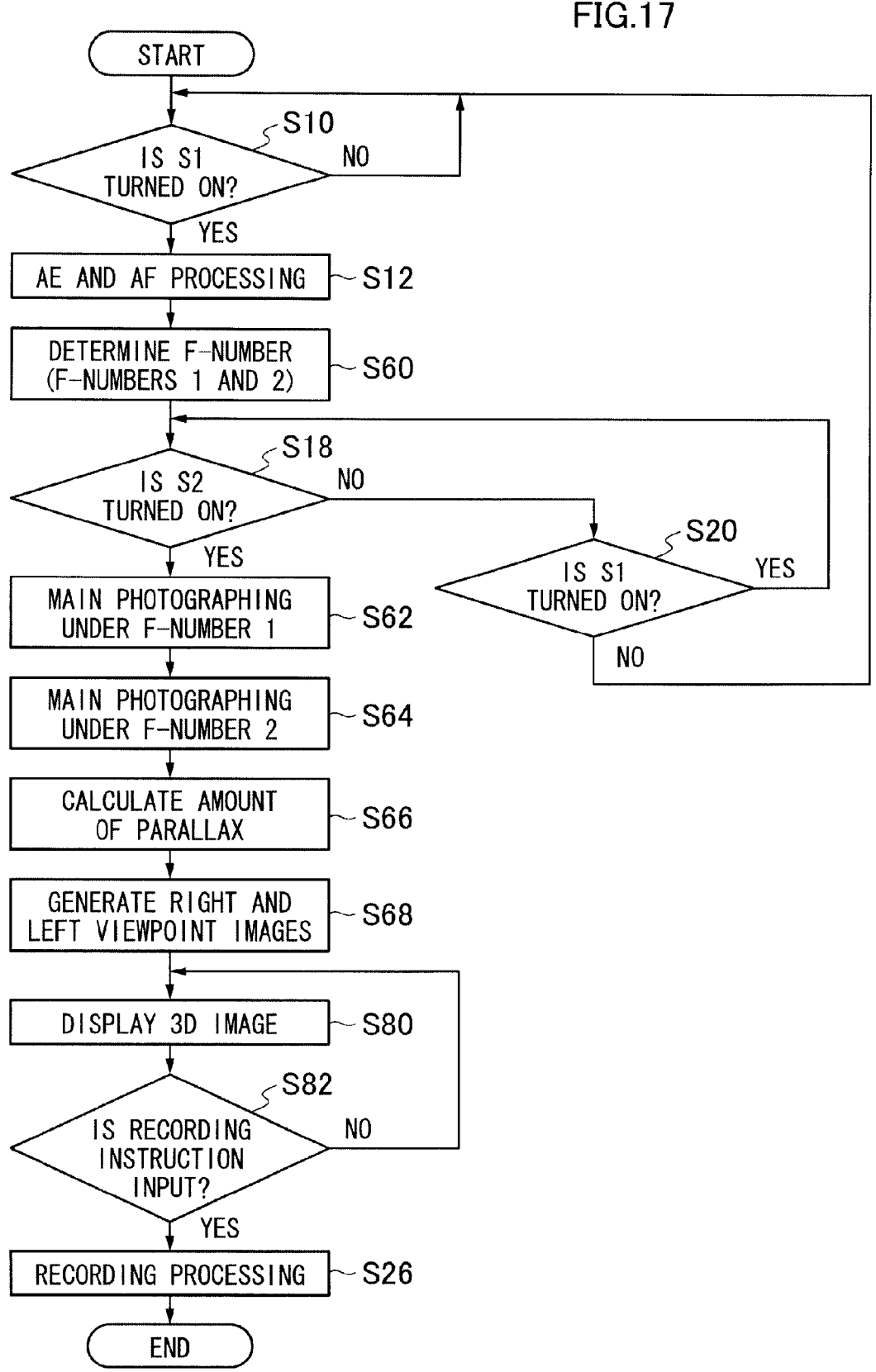
FIG. 17 is a flowchart illustrating a photographing operation of a stereoscopic imaging apparatus according to a seventh embodiment of the present invention.

FIG. 17 is a flowchart illustrating a photographing operation of a stereoscopic imaging apparatus 10 according to a seventh embodiment of the present invention. Steps common to those in the fifth embodiment illustrated in FIG. 15 are assigned the same step numbers, and hence detailed description thereof is not repeated.

The seventh embodiment differs from the fifth embodiment in that processes in steps S80 and S82 are added, as illustrated in FIG. 17, between the processes in steps S68 and S26 illustrated in FIG. 14.

In step S80, a CPU 40 sequentially displays three 3D images for stereoscopic viewing, i.e., first main and sub-images and second main and sub-images, which have been acquired by diaphragm bracketing photographing (steps S62 and S64) and left and right viewpoint images, which have been generated in step S68, simultaneously or one by one on a liquid crystal monitor 30.

A user can select desired one of the three 3D images as a recording image using an operation unit 38.

In step S82, the CPU 40 monitors input of selection of the 3D image from the operation unit 38 and input of an instruction to record the 3D image. If the recording instruction is input (YES in step S82), the processing proceeds to step S26. In step S26, the CPU 40 records the 3D image selected by the user.

Thus, the 3D image having an appropriate amount of parallax or the 3D image preferred by the user out of the three 3D images can be recorded.

[Others]

Figure 18:
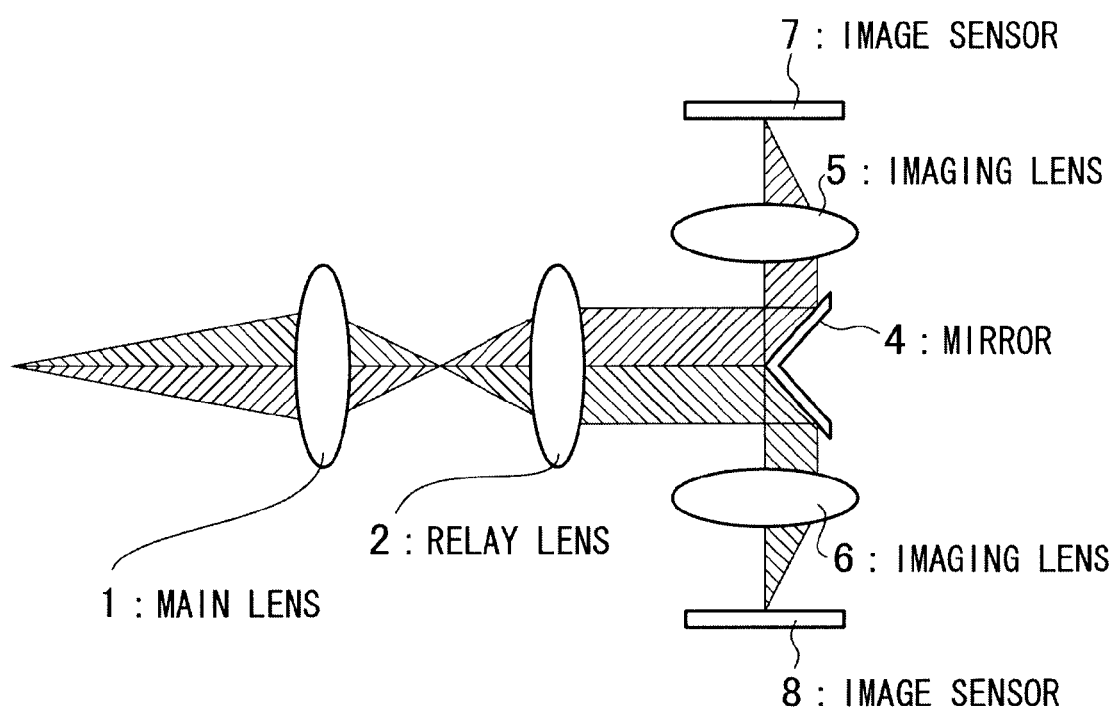
FIG. 18 illustrates an example of an optical system in a conventional stereoscopic imaging apparatus.
Figure 19:
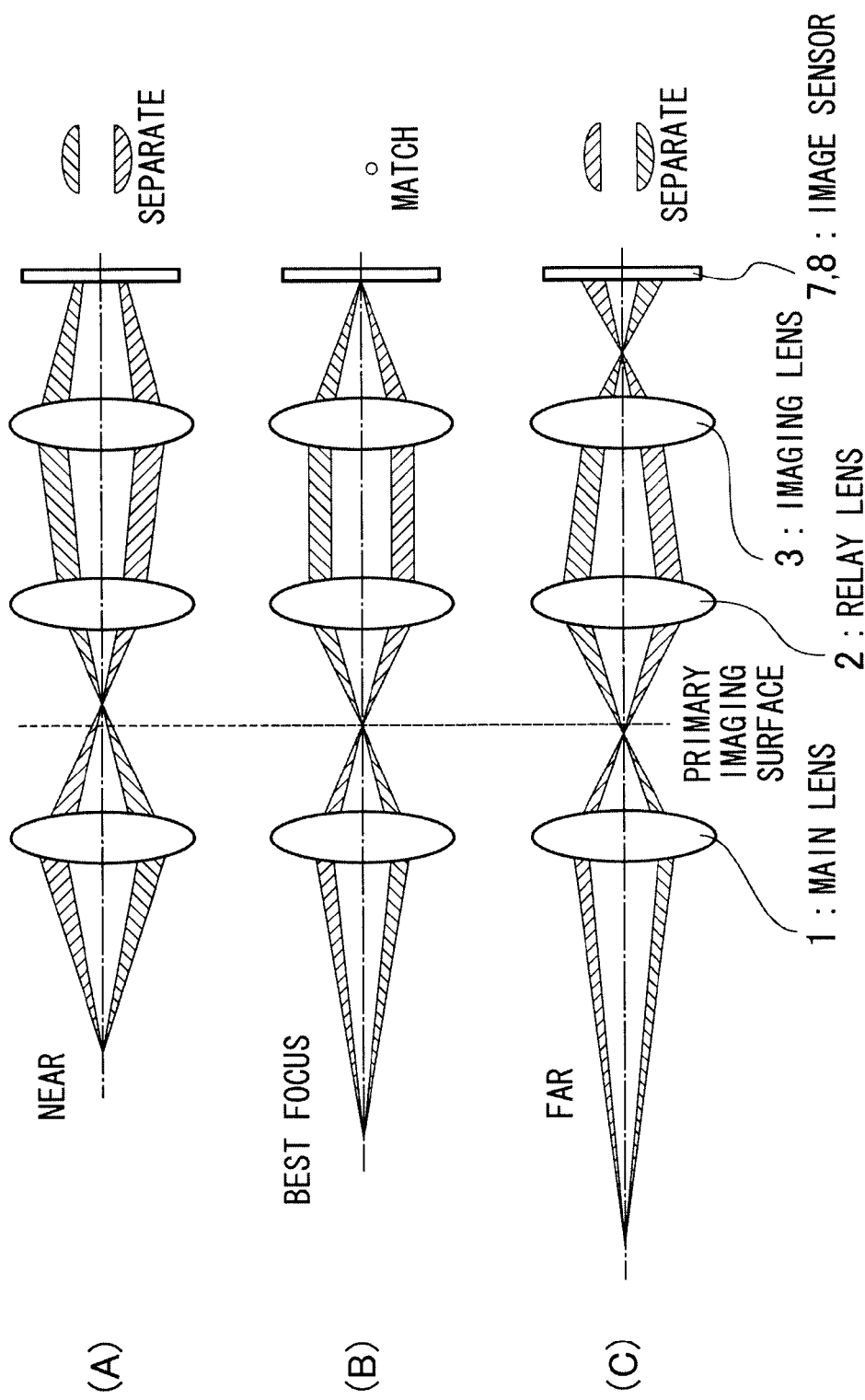
FIG. 19 illustrates the principle that a stereoscopic imaging apparatus captures images between which there is a phase difference.

A stereoscopic imaging apparatus 10 according to the present embodiment can be made smaller in size than that using the two image sensors 7 and 8 illustrated in FIG. 16 because it uses one phase-difference CCD 16. However, the present invention is not limited to a stereoscopic imaging apparatus using one image sensor. The present invention is also applicable to a stereoscopic imaging apparatus including a conventional optical system and image sensor illustrated in FIG. 18.

The image sensor is not limited to a CCD sensor according to the present embodiment. The image sensor may be an image sensor such as a complementary metal-oxide semiconductor (CMOS) sensor.

While in the above-mentioned embodiments, a main image and a sub-image representing subject images that are pupil-split in a horizontal direction are obtained, the number of subject images that are pupil-split is not limited to two. A pupil splitting direction is not limited to a horizontal direction. The pupil splitting direction may be a vertical and horizontal direction.

Further, the present invention is not limited to the above-mentioned embodiments. Various modifications can be made without departing from the spirit of the present invention. For example, the present technique may be used for capturing video images, moving images, and live view images as well as still images.

What is claimed is:

1. A stereoscopic imaging apparatus comprising:
   a single photographic optical system;
   an image sensor, on which subject images that have passed through different first and second areas in a predetermined direction of the photographic optical system, respectively, are formed after being pupil-split, configured to photoelectrically convert the subject images that have passed through the first and second areas, respectively, to output a first image and a second image;
   a diaphragm configured to restrict a light flux incident on the image sensor;
   a subject information acquiring device configured to acquire distance information of a subject within a photographic angle of view or a device configured to acquire an amount of parallax of the subject; and
   a diaphragm control device configured to set an F-number of the diaphragm so that a parallax between the first image and the second image is in a predetermined range based on the acquired distance information of the subject or the acquired amount of parallax of the subject,
   wherein the diaphragm control device determines the F-number of the diaphragm in accordance with the distance information of a nearest subject or a main subject within the photographic angle of view so that a shorter a distance represented by the distance information is, a larger the F-number becomes and a longer the distance is, a smaller the F-number becomes.

2. The stereoscopic imaging apparatus according to claim 1, further comprising:
   an image acquiring device configured to acquire the first image and the second image before main photographing, and
   a parallax amount detection device configured to detect the amount of parallax of the subject within the photographic angle of view based on the first and second images acquired before the main photographing,
   wherein the diaphragm control device controls the F-number of the diaphragm so that the parallax between the first and second images output from the image sensor at the time of the main photographing based on the detected amount of parallax is in the predetermined range.

3. The stereoscopic imaging apparatus according to claim 2, wherein the diaphragm control device brings the diaphragm into an open state when acquiring the first image and the second image before the main photographing.

4. The stereoscopic imaging apparatus according to claim 2, further comprising:
   a parallax amount detection device configured to detect the amount of parallax of the subject within the photographic angle of view based on the first and second images acquired before the main photographing, and
   a warning device configured to display a warning when the parallax between the first and second images obtained at the time of the main photographing based on the detected amount of parallax is not in the predetermined range.

5. A stereoscopic imaging apparatus comprising:
a single photographic optical system;
an image sensor, on which subject images that have passed through different first and second areas in a predetermined direction of the photographic optical system, respectively, are formed after being pupil-split, configured to photoelectrically convert the subject images that have passed through the first and second areas, respectively, to output a first image and a second image;
a diaphragm configured to restrict a light flux incident on the image sensor;
a recognition device configured to recognize a main subject; and
a diaphragm control device configured to read out an F-number corresponding to the recognized main subject from a memory previously storing an F-number for each type of a main subject and set an F-number of the diaphragm to the read out F-number, wherein the set F-number maintains a parallax of the first image and the second image to a predetermined range.

6. The stereoscopic imaging apparatus according to claim 5, wherein the diaphragm control device performs control so that an aperture of the diaphragm is increased when the recognized main subject is a person or a scene.

7. A stereoscopic imaging apparatus comprising:
a single photographic optical system;
an image sensor, on which subject images that have passed through different first and second areas in a predetermined direction of the photographic optical system, respectively, are formed after being pupil-split, configured to photoelectrically convert the subject images that have passed through the first and second areas, respectively, to output a first image and a second image;
a diaphragm configured to restrict a light flux incident on the image sensor;
a selection device configured to select a photographing mode; and
a diaphragm control device configured to control an F-number of the diaphragm depending on the selected photographing mode,
wherein the diaphragm control device is configured to read an aperture value from memory and set an aperture value of the diaphragm, wherein the diaphragm is increased when the selected photographing mode is a scene mode, and wherein the diaphragm is decreased when the selected photographing mode is a macro mode.

8. A stereoscopic imaging apparatus, comprising:
a single photographic optical system;
an image sensor, on which subject images that have passed through different first and second areas in a predetermined direction of the photographic optical system, respectively, are formed after being pupil-split, configured to photoelectrically convert the subject images that have passed through the first and second areas, respectively, to output a first image and a second image;
a diaphragm configured to restrict a light flux incident on the image sensor; and
a diaphragm bracketing photographing device configured to change an F-number of the diaphragm by performing an operation for issuing a photographing instruction once, to perform main photographing a plurality of times,
wherein the diaphragm bracketing photographing device reads the F-number and changes the F-number of the diaphragm every time the main photographing is performed while controlling amounts of exposure at the time of each of the plurality of times of photographing to be constant.

9. A stereoscopic imaging apparatus, comprising:
a single photographic optical system;
an image sensor, on which subject images that have passed through different first and second areas in a predetermined direction of the photographic optical system, respectively, are formed after being pupil-split, configured to photoelectrically convert the subject images that have passed through the first and second areas, respectively, to output a first image and a second image;
a diaphragm configured to restrict a light flux incident on the image sensor;
a diaphragm bracketing photographing device configured to change an F-number of the diaphragm by performing an operation for issuing a photographing instruction once, to perform main photographing a plurality of times;
a F-number image acquiring device configured to acquire images having a small F-number and images having a large F-number from the image sensor when the diaphragm bracketing photographing device performs the main photographing the plurality of times,
a parallax amount calculation device configured to calculate a first amount of parallax and a second amount of parallax, respectively, based on the acquired images having a small F-number and the acquired images having a large-number, and
an image generation device configured to generate left and right viewpoint images based on the acquired images having a large F-number and the calculated first and second amounts of parallax.

10. The stereoscopic imaging apparatus according to claim 9, further comprising:
a parallax amount restriction device configured to restrict the amount of parallax calculated by the parallax amount calculation device not to exceed a predetermined maximum value,
wherein the image generation device uses the amount of parallax restricted by the parallax amount restriction device when the left and right viewpoint images are generated.

11. The stereoscopic imaging apparatus according to claim 9, further comprising:
a moving object determination device configured to determine the presence or absence of a moving object within a photographic angle of view based on the amount of parallax calculated by the parallax amount calculation device,
wherein the image generation device stops generating the right and left parallax images when the moving object determination device determines that the moving object exists.

12. The stereoscopic imaging apparatus according to claim 11, wherein the moving object determination device determines that the moving object exists when a difference value at a corresponding pixel between the first and second amounts of parallax calculated by the parallax amount calculation device exceeds an upper-limit value or a lower-limit value of a defined range at the pixel.

13. The stereoscopic imaging apparatus according to claim 9, further comprising:
a stereoscopic image display device,
a display control device configured to display each of the acquired images having a small F-number, the acquired images having a large F-number, and the generated left and right viewpoint images on the stereoscopic image display device, an input device configured to receive designation of one, to be recorded on a recording medium, of the images displayed on the stereoscopic image display device by input from a user, and a recording device configured to record the image designated by the user on the recording medium.

14. The stereoscopic imaging apparatus according to claim 1, wherein the image sensor includes a first group of pixels and a second group of pixels for photoelectric conversion each arranged in a matrix shape on a substantially whole surface of an exposure area of the image sensor, the first group of pixels being restricted in a light flux receiving direction to receive only the subject image that has passed through the first area of the photographic optical system, and the second group of pixels being restricted in a light flux receiving direction to receive only the subject image that has passed through the second area of the photographic optical system, and can read out the first image and the second image, respectively, from the first group of pixels and the second group of pixels.

* * * * *